(12) United States Patent
Spannhake, II et al.

(10) Patent No.: US 12,164,525 B2
(45) Date of Patent: Dec. 10, 2024

(54) SYSTEMS AND METHODS FOR AGGREGATING TIME-SERIES DATA STREAMS BASED ON POTENTIAL STATE CHARACTERISTICS FOLLOWING AGGREGATION

(71) Applicant: Citibank, N.A., New York, NY (US)

(72) Inventors: Ernst Wilhelm Spannhake, II, Canal Winchester, OH (US); Thomas Francis Gianelle, Colleyville, TX (US); Milan Shah, Plano, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/354,569

(22) Filed: Jul. 18, 2023

(65) Prior Publication Data

US 2024/0193165 A1    Jun. 13, 2024

Related U.S. Application Data

(63) Continuation-in-part of application No. 18/174,498, filed on Feb. 24, 2023, now Pat. No. 11,868,860,
(Continued)

(51) Int. Cl.
*G06F 18/2321*    (2023.01)
*G06F 16/2455*    (2019.01)
(Continued)

(52) U.S. Cl.
CPC .. *G06F 16/24568* (2019.01); *G06F 16/24556* (2019.01); *G06F 16/2477* (2019.01);
(Continued)

(58) Field of Classification Search
CPC ...... G06N 3/0464; G06N 3/045; G06N 3/088; G06F 16/24568; G06F 16/24556;
(Continued)

(56) References Cited

U.S. PATENT DOCUMENTS

| | | | |
|---|---|---|---|
| 2014/0258254 A1* | 9/2014 | Suleiman | G06F 16/34 707/703 |
| 2019/0171459 A1* | 6/2019 | Nakagawa | G06F 11/3072 |

(Continued)

OTHER PUBLICATIONS

Hippenstiel, Ralph, Hassan El-Kishky, and Penio Radev. "On time-series analysis and signal classification—part I: fractal dimensions." Conference Record of the Thirty-Eighth Asilomar Conference on Signals, Systems and Computers, 2004 . . . vol. 2. IEEE, 2004: 2121-2125 (Year: 2004).*

(Continued)

*Primary Examiner* — Randall K. Baldwin
(74) *Attorney, Agent, or Firm* — Foley & Lardner LLP

(57) ABSTRACT

Systems and methods are described herein for novel uses and/or improvements to data aggregation related to artificial intelligence applications, specifically applications related to aggregating time-series data. As one example, systems and methods are described herein for predicting effects when aggregating time-series data and modifying the one or more data streams used to populate a model profile and/or feed an artificial intelligence application with the time-series data.

19 Claims, 12 Drawing Sheets

Related U.S. Application Data which is a continuation-in-part of application No. 18/065,441, filed on Dec. 13, 2022, now Pat. No. 11,704,540.

(51) Int. Cl.
*G06F 16/2458* (2019.01)
*G06F 16/248* (2019.01)
*G06F 18/2415* (2023.01)

(52) U.S. Cl.
CPC ........ *G06F 16/248* (2019.01); *G06F 18/2321* (2023.01); *G06F 18/2415* (2023.01)

(58) Field of Classification Search
CPC ............... G06F 16/2477; G06F 16/248; G06F 18/2415; G06F 18/2321
See application file for complete search history.

(56) References Cited

U.S. PATENT DOCUMENTS

| | | | | |
|---|---|---|---|---|
| 2020/0012902 | A1* | 1/2020 | Walters | G06T 7/248 |
| 2020/0302296 | A1* | 9/2020 | Miller | G06N 20/20 |
| 2020/0334635 | A1* | 10/2020 | Busey | G06V 10/774 |
| 2021/0049700 | A1* | 2/2021 | Nguyen | G06N 3/08 |
| 2021/0081759 | A1* | 3/2021 | Zhao | G06N 3/049 |
| 2021/0248503 | A1* | 8/2021 | Hickey | G06F 18/2113 |
| 2021/0256378 | A1* | 8/2021 | Watt | G06N 3/044 |
| 2021/0397938 | A1* | 12/2021 | Tora | G06F 16/904 |
| 2022/0292308 | A1* | 9/2022 | Schwiep | G06F 18/213 |
| 2022/0366494 | A1* | 11/2022 | Cella | H04L 9/50 |
| 2023/0164035 | A1* | 5/2023 | Nagar | H04L 41/147 714/37 |
| 2023/0306284 | A1* | 9/2023 | Tappin | G06F 16/24534 706/11 |

OTHER PUBLICATIONS

Wang, Xiaozhe, Kate Smith, and Rob Hyndman. "Characteristic-based clustering for time series data." Data mining and knowledge Discovery 13 (2006): 335-364. (Year: 2006).*

Lu, Weining, et al. "Unsupervised sequential outlier detection with deep architectures." IEEE transactions on image processing 26.9 (2017): 4321-4330. (Year: 2017).*

Vargas, Manuel R., et al. "Deep learning for stock market prediction using technical indicators and financial news articles." 2018 international joint conference on neural networks (IJCNN). IEEE, 2018. (Year: 2018).*

Sezer, Omer Berat, and Ahmet Murat Ozbayoglu. "Algorithmic financial trading with deep convolutional neural networks: Time series to image conversion approach." Applied Soft Computing 70 (2018): 525-538. (Year: 2018).*

Sezer, Omer Berat, and Ahmet Murat Ozbayoglu. "Financial trading model with stock bar chart image time series with deep convolutional neural networks." arXiv preprint arXiv:1903.04610 (2019): 1-15 (Year: 2019).*

Rivera-Castro, Rodrigo, et al. "Topology-based clusterwise regression for user segmentation and demand forecasting." 2019 IEEE International Conference on Data Science and Advanced Analytics (DSAA). IEEE, 2019: 326-336 (Year: 2019).*

Tovar, Wilfredo. "Deep Learning Based on Generative Adversarial and Convolutional Neural Networks for Financial Time Series Predictions." arXiv preprint arXiv:2008.08041 (2020). (Year: 2020).*

Sridhar, Sashank, and Sowmya Sanagavarapu. "Effect of Rate of Change of Stock Prices with News Sentiment Analysis." 2021 18th International Conference on Electrical Engineering, Computing Science and Automatic Control (CCE). IEEE, 2021. (Year: 2021).*

Nalabala, Deepika, and Mundukur Nirupamabhat. "Financial predictions based on fusion models—a systematic review." 2021 International Conference on Emerging Smart Computing and Informatics (ESCI). IEEE, 2021: 28-37 (Year: 2021).*

Zhuzhel, Vladislav, et al. "COHORTNEY: Non-Parametric Clustering of Event Sequences." arXiv preprint arXiv:2104.01440 (2021). (Year: 2021).*

Rimal, Binod. Financial Time-Series Analysis with Deep Neural Networks. Diss. Florida Atlantic University, Aug. 2022: i-139 (Year: 2022).*

Liu, Ya, et al. "Unsupervised Deep Learning for IoT Time Series." arXiv preprint arXiv:2302.03284 (Feb. 21, 2023): 1-22 (Year: 2023).*

Pletnev, Aleksandr, Rodrigo Rivera-Castro, and Evgeny Burnaev. "Graph Neural Networks for Model Recommendation using Time Series Data." 2020 19th IEEE International Conference on Machine Learning and Applications (ICMLA). IEEE, 2020. (Year: 2020).*

Gonzalez-Vidal, Aurora, Payam Barnaghi, and Antonio F. Skarmeta. "Beats: Blocks of eigenvalues algorithm for time series segmentation." IEEE Transactions on Knowledge and Data Engineering 30.11 (2018): 2051-2064. (Year: 2018).*

Stamatescu, Grigore, et al. "Deep and efficient impact models for edge characterization and control of energy events." 2019 IEEE 25th International Conference on Parallel and Distributed Systems (ICPADS). IEEE, 2019. (Year: 2019).*

Gajowniczek, Krzysztof, Marcin Bator, and Tomasz Ząbkowski. "Whole time series data streams clustering: dynamic profiling of the electricity consumption." Entropy 22.12 (2020): 1414. (Year: 2020).*

Non-Final Office Action issued in related U.S. Appl. No. 18/327,850 on Dec. 21, 2023 (39 pages).

Alex Boyd et al., "User-dependent neural sequence models for continuous-time event data," Advances in Neural Information Processing Systems 33 (2020): 21488-21499 (Year: 2020).

* cited by examiner

SYSTEMS AND METHODS FOR AGGREGATING TIME-SERIES DATA STREAMS BASED ON POTENTIAL STATE CHARACTERISTICS FOLLOWING AGGREGATION

CROSS-REFERENCE TO RELATED APPLICATIONS

This application is a continuation of U.S. Pat. No. 11,704,540, filed Dec. 13, 2022, the content of which is incorporated herein in its entirety by reference. This application is further related to U.S. Pat. No. 11,868,860, filed Feb. 24, 2023, which is a continuation-in-part of U.S. Pat. No. 11,704,540, filed Dec. 13, 2022. The content of the foregoing applications is incorporated herein in its entirety by reference.

BACKGROUND

Artificial intelligence, including, but not limited to, machine learning, deep learning, etc. (referred to collectively herein as artificial intelligence models, machine learning models, or simply models), has excited the imaginations of industry enthusiasts and the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. Artificial intelligence typically relies on training a model to make predictions and/or perform functions. Such training requires large amounts of high-quality data through which patterns may be detected. The process for obtaining this data and ensuring it is of high quality is often complex and time-consuming. Furthermore, as artificial intelligence is applied to new applications, there may not be any prior data or patterns (or at least those that are recorded) upon which to base training data.

Accordingly, to generate the necessary amount of data to properly train a model to make accurate predictions, systems may need to use data aggregation. Data aggregation refers to the process of combining and summarizing individual data points or records into a more concise and meaningful representation. It involves collecting and merging data from multiple sources, grouping it based on certain criteria, and applying mathematical or statistical operations to derive summary statistics or insights. However, data aggregation also presents numerous technical challenges. For example, aggregating large volumes of data can be computationally intensive and may require efficient algorithms and infrastructure to handle the scale. As the dataset size increases, the processing time and resource requirements may grow significantly. Additionally, aggregating data from multiple sources may involve dealing with different data formats, structures, or schemas. Ensuring proper data integration and compatibility can be challenging, especially when the sources have inconsistencies or conflicting data representations. These technical problems are only further exacerbated when dealing with time-series data.

SUMMARY

Systems and methods are described herein for novel uses and/or improvements to data aggregation related to artificial intelligence applications, specifically applications related to aggregating time-series data. As one example, systems and methods are described herein for predicting effects when aggregating time-series data and modifying the one or more data streams used to populate a model profile and/or feed an artificial intelligence application with the time-series data. That is, the systems and methods may aggregate time-series data streams based on potential state characteristics following aggregation. However, determining whether to aggregate data based on potential state characteristics following aggregation (as opposed to current characteristics of data that may be aggregated) introduces numerous technical challenges.

For example, time-series data is often collected at irregular intervals, making it difficult to align and aggregate the data points. Different time series may have different sampling frequencies or may not be synchronized, leading to challenges in combining them effectively. Second, time-series data frequently contains missing values or gaps due to various reasons such as sensor malfunction, data transmission errors, or simply unavailability of data during specific time periods. Aggregating the data requires handling these missing values appropriately to ensure accurate results. Finally, time-series data from different sources or sensors may have temporal misalignments, meaning they are not synchronized or do not have the same starting and ending time stamps. Aligning these data streams for aggregation purposes can be complex and may require interpolation or resampling techniques. Thus, determining whether to aggregate data based on potential state characteristics following aggregation first requires determining what data is available (or suitable) for aggregation.

To account for the aforementioned technical issues, the systems and methods use a first artificial intelligence model that is trained to cluster a plurality of available time-series data streams into a plurality of time-series data stream clusters by aggregating subsets of the plurality of available time-series data streams. For example, the system may aggregate one or more of the available time-series data streams into clusters of time-series data streams. By doing so, technical issues related to irregular intervals of collection, missing values, and/or temporal misalignments for any given time-series data stream may be mitigated.

However, while clustering available time-series data streams may mitigate some technical issues, clustering alone may not resolve all technical issues related to data aggregation, particularly when determining whether to aggregate data based on potential state characteristics following aggregation. For example, time-series data often exhibits seasonality and trends, which can introduce biases or distortions when aggregating the data. Properly accounting for these patterns is crucial to avoid misleading results. The issue with misleading results is further exacerbated when determining whether to aggregate data based on potential state characteristics following aggregation as any issues (known or unknown) in the data may affect the ability of the system to determine potential state characteristics following aggregation. Accordingly, the systems and methods may determine a similarity between each of the plurality of time-series data stream clusters and time-series data currently used to populate a model profile. By determining the similarity between known data (e.g., the time-series data currently used to populate a model profile) and available clusters of time-series data, the system may mitigate instances in which the clusters introduce biases or distortions when aggregating the data.

Upon determining that a time-series data stream cluster shares a threshold level of similarity with time-series data currently used to populate a model profile (e.g., and thus is unlikely to introduce biases or distortions when aggregating the data), the system may then determine when aggregation of the current time-series data and the time-series data stream cluster would result in the resulting data having inconstant state characteristics to the existing model profile. For example, time-series data can be susceptible to noise, outliers, and/or measurement errors. Identifying and filtering out such anomalies while aggregating the data is important to ensure reliable and accurate results. Similarly, aggregating time-series data involves considering the statistical dependencies and relationships between data points. Simple averaging or summation may not be appropriate if there are complex interactions or dependencies within the data.

Accordingly, the systems and methods may determine whether the time-series data resulting from the aggregation has prerequisite state characteristics (e.g., an acceptable level of noise, outliers, and/or measurement errors). After comparing any resulting state characteristic to the required state characteristic of the model profile, the system may then generate a first recommendation for the first time-series data stream cluster based on comparing the first state characteristic to the required state characteristic. For example, the recommendation may indicate that aggregating particular data, from particular data streams, will or will not result in potential state characteristics following that aggregation.

In some aspects, systems and methods for aggregating time-series data streams based on potential state characteristics following aggregation are described. For example, the system may receive a first model profile, wherein the first model profile is populated based on a first plurality of time-series data streams, and wherein the first model profile corresponds to a required state characteristic. The system may retrieve a first plurality of time-series data stream clusters, wherein the first plurality of data stream clusters is generated by a first artificial intelligence model that is trained to cluster a plurality of available time-series data streams into the first plurality of time-series data stream clusters by aggregating a subset of the plurality of available time-series data streams. The system may determine a first similarity between the first plurality of time-series data streams and each of the first plurality of time-series data stream clusters. The system may select a first time-series data stream cluster from the first plurality of time-series data stream clusters based on the first similarity exceeding a first similarity threshold. The system may generate a second time-series data stream cluster based on aggregating the first time-series data stream cluster and the first plurality of time-series data streams. The system may determine a first state characteristic for the second time-series data stream cluster. The system may compare the first state characteristic to the required state characteristic. The system may generate, at a user interface, a first recommendation for the first time-series data stream cluster based on comparing the first state characteristic to the required state characteristic.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

Figure 1A:
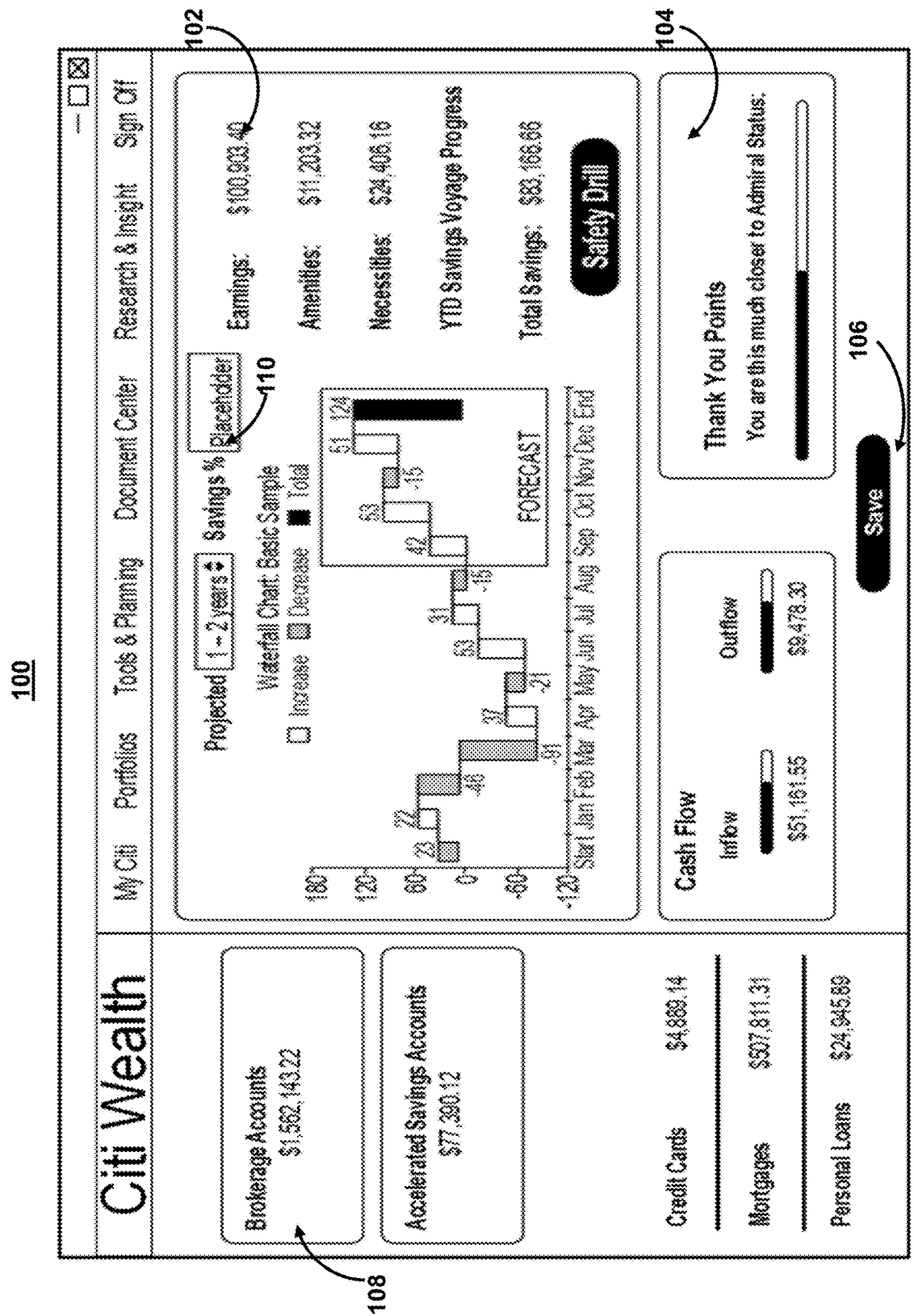
FIG. 1A shows an illustrative user interface comprising recommendations based on a synthetic profile, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, systems and methods are described herein for novel uses and/or improvements to data aggregation related to artificial intelligence applications, specifically applications related to aggregating time-series data. As one example, systems and methods are described herein for predicting effects when aggregating time-series data and modifying the one or more data streams used to populate a model profile and/or feed an artificial intelligence application with the time-series data. That is, the systems and methods may aggregate time-series data streams based on potential state characteristics following aggregation.

For example, there are many situations in which there is value in creating a model that produces an experiential data stream that can be predicted to balance or to amplify the experiential data streams of two or more other data streams (e.g., seed data streams). Artificial intelligence and machine learning can be used to perform the functions needed to create this new model by identifying two or more data streams with experiential data streams that produce or can be predicted to produce outcomes that are inversely proportional to each other and/or offset each other (balancing use cases), and to those that are directly proportional and synergistic to each other (amplifying use cases). Notably, the unit of measure (UOM) for this data is not limited. For example, the UOM may be risk, monetary streams, sentiment, etc. Alternatively or additionally, the UOM of the participating entities may be the same, but this is not a requirement. For example, the data used to determine the correlation between the entities may be actual or synthetic time-series data.

For example, the model may then produce an experiential data stream that represents a new desired level of units. The desired stream may be a balance between the two or more seed data streams, which can be used to offset the effects of one of the seed data streams. The desired data stream may be an amplification of the two or more seed data streams, which can be used to generate a data stream that is greater than the sum of the seed data streams. The likelihood and degree of amplification or balancing can be established and the model will develop outcome data streams that align with the desired targets. The newly created model may be of a similar nature to the seed data streams, or can be dissimilar. For example, similar data streams may be referred to as homogeneous entities. Dissimilar data streams may be referred to as heterogenous entities.

Examples of homogeneous data streams that would balance the outcomes of two seed data streams may include a model that: creates a commodity fund that balances the performance of two or more other commodity funds involved in energy production such as oil and lithium; develops the attributes and backstory of a new fictional character that balances the reception of two or more existing characters with target audience demographics; creates a new currency that balances the performance of selected digital currencies with selected fiat currencies; creates a company that invests in both new house building companies and rental companies, adjusting the investment to offset risk in either; creates a moderated news channel that balances the extremes of existing news outlets, providing content that is relevant to the target audience and/or demographics.

Examples of heterogeneous data streams that would balance the outcomes of two seed data streams may include a model that: creates a fund that balances the performance of two commodities involved in energy production such as oil and lithium; automatically creates a structured note that balances the risk of a bond and derivative/equity within the risk appetite of the potential owners; creates a fund that balances the performance of selected digital currencies with selected fiat currencies; creates a fund that balances the performance of new house building companies and rental companies, adjusting the investment to offset risk in either; and/or creates a fund that makes and/or shorts environmental, social, and governance (ESG) investments based on political sentiment within geopolitical jurisdictions or regions.

Examples of homogeneous data streams that would amplify the outcomes of two seed data streams may include a model that: creates a commodity fund that shorts the performance of one or more other commodity funds involved in energy production such as oil and lithium; and/or creates a movie plot and script that creatively merges the storylines of successful movies and avoids plot components that have been shown to produce negative target audience reactions.

Examples of heterogeneous data streams that would amplify the outcomes of two seed data streams may include a model that: creates a company that invests in transportation as a service based on the projected numbers of autonomous vehicles and performance of automotive battery and hydrogen fuel cell companies; creates and invests in a company that authors scripts using artificial intelligence based on performance of streaming services and the average salaries of screenwriters; creates a fund that invests in artificial meat production based on manufacturing scalability improvements and consumer sentiment analysis, particularly vegetarian adoption likelihood; creates a fund that invests in or shorts meat production (e.g., chicken farms, etc.) based on manufacturing scalability improvements and consumer sentiment analysis, particularly vegetarian adoption likelihood.

In some embodiments, systems and methods may use one or more artificial intelligence models that predict an effect and/or occurrence of a predicted event based on the current state of the system. For example, the model may predict how a rate of change in time-series data (e.g., representing a current growth trajectory of the state) may be altered throughout the first time period based on the predicted event. However, as noted above, correctly predicting the occurrence of these events (which may comprise outliers to the normal trajectory), and in particular characteristics about these events (e.g., when an event may occur, what may be a source of the event, what rate of change the event may cause, etc.) in data-sparse environments (including environments featuring data with low interpretability), and based on time-series data, presents a technical challenge.

For example, in such data-sparse environments, one solution is to generate artificial data. While there are various techniques for doing so, generating artificial time-series data is particularly problematic as the temporal relationship between the data must be preserved. Because of this, the techniques for generating artificial time-series data are limited to the techniques that can preserve and/or mimic this relationship. One such approach may include distribution-based techniques for generating artificial data (e.g., using bootlegging, resampling, etc.). Distribution-based techniques aim to mimic (not duplicate) time-series data at its normal distributions. However, while distribution-based techniques may mimic the "average" data, distribution-based techniques are ill suited for generating outliers (e.g., events with significant impact) within the data. This is particularly problematic in applications in which the outliers are more important.

To overcome this technical challenge, the system may generate predictions based on non-homogenous data. The system may use a first data set to determine a trajectory of a current state. The system may then use a different data set to predict the occurrence of the outlier event. For example, the system may select a second data set (i.e., a non-homogenous data set) comprising actual (i.e., not predicted) data, thus creating a "synthetic profile." The actual data found in the synthetic profile may comprise historic time-series data in which the historic time-series data indicates historic rates of change over a given time period. Furthermore, the system may filter the historic data set that is used based on similarities between the current state characteristics and/or required future state characteristics of the first system at the end of the first time period. That is, the system may select a second data set from a plurality of historic data sets based on the second data set having certain characteristics (e.g., similar state characteristics at the beginning or ending of a selected time period, similar trajectories, similar user profiles of users upon which the state is based, etc.). The system may then analyze the second data set for potentially significant events (e.g., events corresponding to a rate of change beyond a threshold).

Notably, upon identifying potentially significant events, which may include the events' time and magnitude, the system combines this information along with the first data set to generate a first feature input. Furthermore, to alleviate issues, if any, resulting from the differences in the non-homogenous data, the information (e.g., time, magnitude, and/or other characteristics) about predicted events is normalized to correspond to the characteristics of the first data set. For example, if a predicted event occurs in the fifth year from the beginning of the second time period, the system normalizes the predicted event to occur in the fifth year from the beginning of the first time period (even if the first time period and the second time period began at different times). The first feature input is then submitted to an artificial intelligence model that is trained to predict first rates of change over a first time period. The previously identified predictions (e.g., corresponding to a predicted event and/or characteristics of the event) are then applied to first rates of change over the first time period to generate recommendations for responding to the predicted events (e.g., recommending to maintain a current state, recommending to modify a state in a particular manner, etc.).

For example, by training the artificial intelligence model on both the first and second data sets, the system mitigates the problem with low amounts of high-quality data (e.g., the system maximizes the amount of training data available). Secondly, by using the actual data from the second data set (e.g., indicating past events), the system mitigates potential precision and accuracy issues in relying on an artificial intelligence model to predict outlier events to a trajectory of the time-series data and/or characteristics about the outlier events. Furthermore, the system may in some embodiments process numerous data sets to identify predicted events and average information about them. Finally, by combining the normalized predicted events data with the first data set, the system generates predictions based on the state of the first data set, but with predicted events occurring at the normalized time and having the normalized magnitude.

In some embodiments, systems and methods for responding to predicted events in computer systems based on predicted events in time-series data using artificial intelligence models trained on non-homogenous, time-series data are described. For example, the system may receive a first data set comprising a current state characteristic for a first system state. The system may receive a required future state characteristic for the first system state. The system may select a second data set from a plurality of available datasets based on similarities between state characteristics for the second data set and the current state characteristic and the required future state characteristic, wherein the second data set comprises second rate-of-change data over a second time period. The system may compare the second rate-of-change data to a threshold rate of change to detect a rate-of-change event. The system may generate a normalized rate-of-change event by normalizing the rate-of-change event based on the first data set. The system may input the first data set into a first model to generate first rate-of-change data over a first time period for the first system state. The system may generate modified first rate-of-change data based on the normalized rate-of-change event. The system may generate for display, on a user interface, a recommendation based on the modified first rate-of-change data.

In some embodiments, systems and methods are described herein for predicting events in time-series data and modifying one or more characteristics of a current state accordingly. For example, the systems and methods may detect significant events (e.g., identify and measure events that correspond to rates of change in time-series data beyond a contextually relevant common threshold). Based on these predictions, the system may provide recommendations for changes in current characteristics of the state that may mitigate or take advantage of the effects of these predicted events (e.g., provide recommended changes to current characteristics in order to mitigate predicted rates of change over a first time period in the first time-series data). Furthermore, these recommendations may be based on non-obvious positive and negative events that are time-based and contextually relevant to a given individual/entity.

To achieve these predictions, the systems and methods may use one or more artificial intelligence models that predict an effect and/or occurrence of a predicted event based on the current state of the system. In order to generate responses that are both timely and pertinent (e.g., in a dynamic fashion), the system must determine both quickly (i.e., in real time or near real time) and accurately the predicted event. However, making such determinations faces an initial technical hurdle; while the determination must be made quickly and accurately, the system may have little information available to distinguish a positive detection from a false-positive determination. Moreover, the information available may be similar or the same for most categories of information.

In order to overcome the technical issues of only a little, incomplete, and/or inconclusive data being available, the system uses a two-tier approach in which the system first determines a likely cohort of users that may indicate the most likely categories of information (e.g., similar state characteristics) that are relevant for a given prediction for users of that cohort. The system then determines, based on a model trained specifically for those state characteristics, whether or not a predicted event (and/or a magnitude of the predicted event) is likely to occur. For example, the methods and systems may include a first artificial intelligence model, wherein the first artificial intelligence model is trained to cluster a plurality of separate time-series data streams into a plurality of cohort clusters through unsupervised hierarchical clustering. The methods and systems may also use a second artificial intelligence model, wherein the second artificial intelligence model is trained to select a subset of the plurality of cohort clusters from the plurality of cohort clusters based on a first feature input, and wherein each cohort cluster of the plurality of cohort clusters corresponds to a respective cohort of users having similar current state characteristics.

In some aspects, systems and methods are described herein for using cohort-based predictions in clustered time-series data in order to detect significant rate-of-change events. For example, the system may receive a first user profile, wherein the user profile comprises a current state characteristic. The system may, in response to receiving the first user profile, determine a first feature input based on the first user profile. The system may retrieve a plurality of cohort clusters, wherein the plurality of cohort clusters is generated by a first artificial intelligence model that is trained to cluster a plurality of separate time-series data streams into the plurality of cohort clusters. The system may input the first feature input into a second artificial intelligence model, wherein the second artificial intelligence model is trained to select a subset of the plurality of cohort clusters from the plurality of cohort clusters based on the first feature input, and wherein each cohort cluster of the plurality of cohort clusters corresponds to a respective cohort of users having similar current state characteristics. The system may receive an output from the second artificial intelligence model. The system may select, based on the output, a time-series prediction from a plurality of time-series predictions, wherein each of the plurality of time-series predictions comprises a respective predicted event, and wherein each cohort cluster of the subset of the plurality of cohort clusters corresponds to a respective time-series prediction of the plurality of time-series predictions. The system may generate, at a user interface, the time-series prediction.

FIG. 1A shows an illustrative user interface comprising recommendations based on a synthetic profile, in accordance with one or more embodiments. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

In some embodiments, the content may comprise a client portal that provides recommendations based on one or more models. For example, the client portal may identify context-relevant, time-based observations and share these observations as recommendations (e.g., recommendation 102) with the client. The recommendations may provide a line of sight to the areas that clients may want to consider but were not aware they should be considering in an intermediate timeframe. For example, the clients have numerous options for planning major life events, and the system (e.g., via user interface 100) may act as a conduit to allow clients to have control of the intermediate term and expose them to one or more features.

In some embodiments, the system may be used to create, recommend, and/or manage structured notes for a user. For example, the system may deliver proactive alerts, respond to real-time performance of a structured note, and/or advise whether any action needs to be taken to mitigate any issues detected with the performance of the structured note. In some embodiments, the system may use determinations related to structured notes to dynamically adjust investment goals and objectives over time. For example, the system may act as an always-on advisor for portfolio management.

In some embodiments, the content may comprise awards that are achievable within certain timeframes to incent behavior in line with the client's unique objectives (e.g., recommendation 104). For example, by establishing a "status" level with various aspirational levels, the system may incentivize a client to increase use of the system. The system may also provide one or more recommendations that are interactive. These interactive recommendations may allow a user to enter data or save data (e.g., via icon 106).

In some embodiments, the system may monitor content generated by the user to generate user profile data such as user profile data 108. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system's active or passive monitoring.

In some embodiments, a user characteristic may comprise a current state characteristic. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc. For example, user profile data 108 may comprise a current state characteristic.

In some embodiments, a user characteristic may comprise a required future state characteristic (or simply a required state characteristic). For example, the "required future state characteristic" may comprise a given rate of return, a total value of the account, etc. for the user account. As shown in FIG. 1A, a required future state characteristic may comprise a required savings percentage (e.g., user profile data 110). For example, the system may receive a required future state characteristic for the first system state.

Figure 1B:
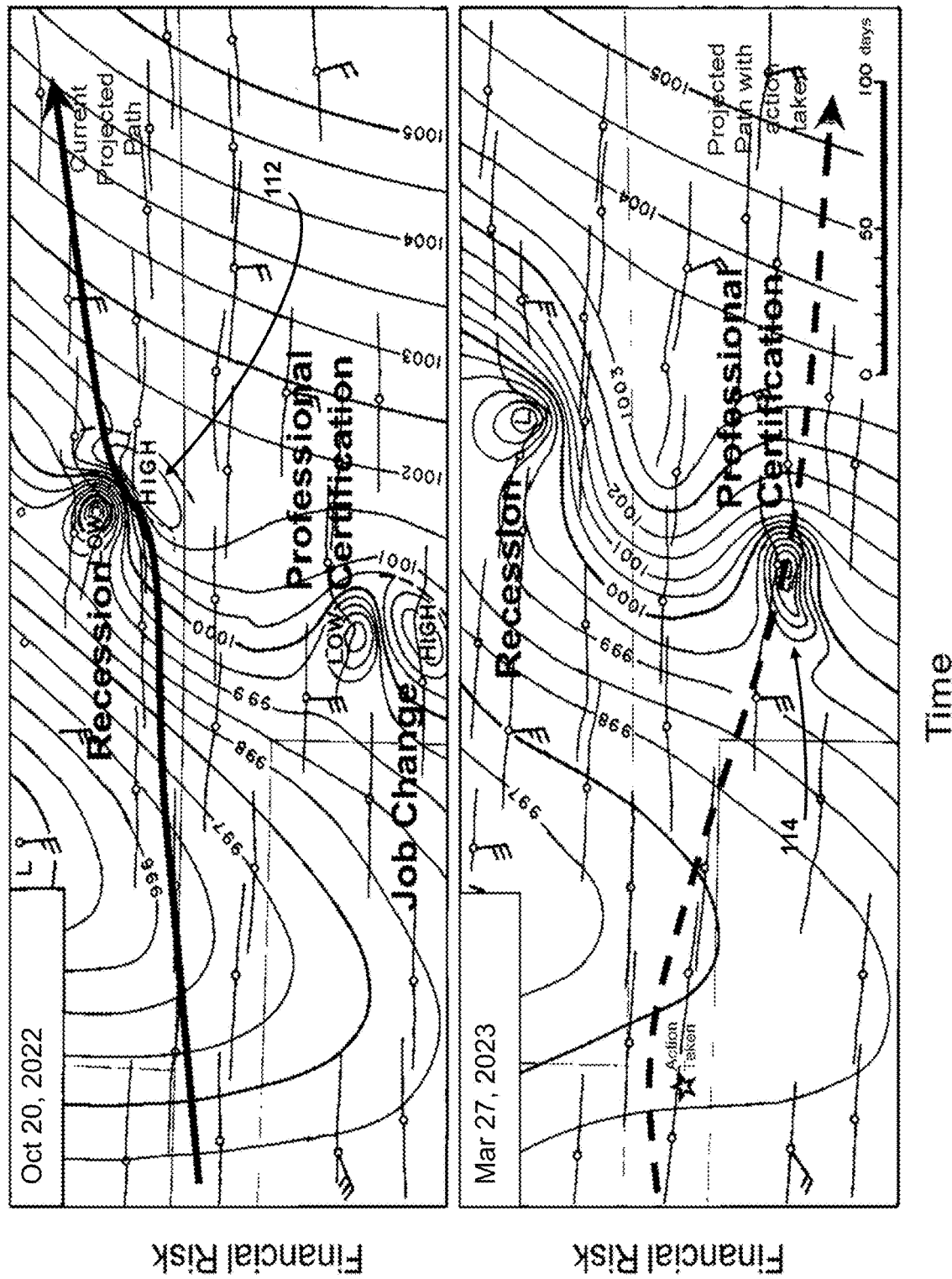
FIG. 1B shows another illustrative user interface comprising an isobaric graphical representation based on a synthetic profile, in accordance with one or more embodiments.

FIG. 1B shows another illustrative user interface comprising an isobaric graphical representation based on a synthetic profile, in accordance with one or more embodiments. For example, in some embodiments, the system may display content in the form of a graphical representation (e.g., either static or dynamic). One such graphical representation may comprise an isobaric graph. In such cases, an outlier event may be represented by an identified pressure point. For example, the system may discern that a particular event or sequence of events results in either statistically significant positive or negative consequences. For example, an isobaric graph is a graph commonly used in mesoanalysis. Mesoanalysis often involves the representation of values according to a gradient or vector and often with a variable scaling factor. For example, mesoanalysis may be used to measure temperature, moisture, pressure, and/or wind variations on horizontal scales of 10-100 km.

For example, an outlier may be analogous to a pressure area on an isobaric chart. It is an area over time where there is a high likelihood that an extreme (high or low) value for the Y-axis unit of measure would be experienced. In one example, such as where the time-series data represents a financial projection, the outlier event may represent a windfall event or a personal or financial emergency that negatively affects the financial projection. Based on detecting these events, the system may generate a recommendation to maintain a current trajectory of a predicted state or may recommend a change to the state.

Alternatively or additionally, the system may determine rate-of-change data over a time period. To do so, the system may analyze time-series data. As described herein, "time-series data" may include a sequence of data points that occur in successive order over some period of time. In some embodiments, time-series data may be contrasted with cross-sectional data, which captures a point in time. A time series can be taken on any variable that changes over time. The system may use a time series to track the variable (e.g., price) of an asset (e.g., security) over time. This can be tracked over the short term, such as the price of a security on the hour over the course of a business day, or the long term, such as the price of a security at close on the last day of every month over the course of five years. The system may generate a time-series analysis. For example, a time-series analysis may be useful to see how a given asset, security, or economic variable changes over time. It can also be used to examine how the changes associated with the chosen data point compare to shifts in other variables over the same time period. For example, with regard to stock portfolio performance, the system may receive time-series data for the various sub-segments indicating daily values for individual stock returns.

In some embodiments, the system may apply one or more types of data conditioning to one or more data sets. For example, data visualization is an important step in analysis of a data set. Plotting large time-series data, however, generates large file sizes, which may slow down user interactions and strain computing resources. Accordingly, the system may condition data in a data set by applying a compression algorithm. For example, the system may receive a raw time-series data. The system may generate a data set by applying a compression algorithm to the raw time-series data.

The time-series analysis may determine various trends such as a secular trend, which describes the movement along the term; a seasonal variation, which represents seasonal changes; cyclical fluctuations, which correspond to periodical but not seasonal variations; and irregular variations, which are other nonrandom sources of variations of series. The system may maintain correlations for this data during modeling. In particular, the system may maintain correlations through non-normalization as normalizing data inherently changes the underlying data, which may render correlations, if any, undetectable and/or lead to the detection of false-positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depend heavily on the normalization choices. Thus, normalization may lead to lower model performance and more model errors.

As such, the system may not rely on a model and data from a first data set (e.g., from a first user) to predict the occurrence of the outlier event. That is, the system does not rely on a model to detect outlier events. Instead, the system may select a second data set (i.e., a non-homogenous data set) comprising actual (i.e., not predicted) data, creating a "synthetic profile." The actual data found in the synthetic profile may comprise second time-series data in which the second time-series data indicates second rates of change over a second time period. The system may select the second data set (or a plurality of data sets) based on similarities between the current state characteristics and/or required future state characteristics of the first system at the end of the first time period. The system may then analyze the second data set for predicted events (e.g., events corresponding to a rate of change beyond a threshold).

For example, the system may comprise a cohort prediction modeling system. The cohort prediction modeling system may identify similar sets of data to that of a user. By doing so, the system may evaluate similar multivariate time-series data to correlate relationships between events or trends and likely outcomes. The data sets may comprise multiple sets of data and/or data collection means. For example, the system may use an array of real-time events, batch data, and/or collected and conditioned data from a wide variety of structured and unstructured data sources to define the cohorts and capture client-specific targeted local, regional, and national data.

In some embodiments, the system conditions individual data sets identifying time-based rates of change. Using ensemble methods, the system combines conditioned data to detect outliers (non-obvious contextual time-based pressure events) creating a "synthetic model." The "synthetic model" outliers are weighted to compare current state characteristics to future state contextually relevant time-based characteristics, allowing for course disruptions (edge path selection) to be identified.

As referred to herein, a "cohort" may comprise one or more other users. Data related to the cohort may be used to generate a synthetic profile. The system may select the cohort based on similarities between the user profile data of a first user and the user profile data of the one or more other users. For example, the system may compare current state characteristics and/or required future state characteristics (e.g., at the end of the first time period) of the first system (e.g., of a first user) to the state characteristics over a time period corresponding to the first time period.

For example, the system may determine a current state characteristic of a first user (e.g., a first account balance) and a required future state characteristic (e.g., an account balance of the first account after five years). The system may then find other users that have historical data showing an initial account balance corresponding to the first account balance and then a final account balance after five years that corresponds to the required future state characteristic. Upon determining that the one or more other users are part of the first user's cohort, the system may retrieve user profile data for the one or more other users. The user profile data of the one or more users may become a second data set upon which a synthetic profile is generated. In some embodiments, the system may collect and condition data to allow a model to "train" itself (e.g., as further described in FIGS. 3A-B below), finding correlations and defining cohorts.

In some embodiments, a cohort may comprise a set that consists of the entities that experienced the data being captured and analyzed. Cohorts may share common attributes that cause them to be selected as members of the set. The system may analyze the cohort data to discern patterns that lead to predicted outcomes. The cohort data may comprise numerous data streams with many units of measures. The system may then segregate the data streams by cohort.

Upon identifying predicted events (e.g., including both their time and magnitude), the system combines this information along with the first data set to generate a first feature input. Furthermore, the information about predicted events is normalized to begin at a time corresponding to the first data set. That is, if the predicted event occurs in the fifth year of the second time period, the system normalizes the predicted event to occur in the fifth year of the first time period (even though the predicted event is actually years in the past). The first feature input is then submitted to an artificial intelligence model that is trained to predict first rates of change over a first time period. The previously identified predictions (e.g., corresponding to a predicted event and/or characteristics of the predicted events) are then applied to first rates of change over the first time period to generate recommendations for responding to predicted events.

For example, a predicted event, outlier event, and/or pressure point may comprise events or situations that present a current or future risk. For example, a predicted event, outlier event, and/or pressure point may be the breaching of a value on the Y-axis unit of measure, where a boundary threshold has been calculated as the upper or lower limit at a given point in time. The system may detect pressure points of interest as ones presented to the client that have a reasonable likelihood of occurring based on the experiences of others in the cohort. The system may also determine degrees of probability of the likelihood of a user navigating (e.g., based on user profile data) into a pressure point, based on the client's trajectory, which is influenced by the client's user profile data, positions, cohort, and/or internal and external state characteristics.

Each pressure point has varying degrees of impact, either positive or negative. As such, the system may determine both the likelihood of a pressure point and its time and/or magnitude. The system may express this impact by the pressure point's position on the Y axis of the isobar map.

As referred to herein, "a data set" may refer to data that is received from a data source that is indexed or archived by time. This may include streaming data (e.g., as found in streaming media files) or may refer to data that is received from one or more sources over time (e.g., either continuously or in a sporadic nature). A data set may indicate a state of the data set at a given time period. For example, a state or instance may refer to a current set of data corresponding to a given time increment or index value. For example, the system may receive time-series data as a data set. A given increment (or instance) of the time-series data may correspond to a state of the data set.

In some embodiments, the system may time-shift data in order to normalize the data. For example, in order to compare a second data set to a first data set, the system may time-shift the data so that the historic data is applied in an appropriate and consistent manner. As one example, if a current state characteristic and a required future state characteristic are five years apart, the system may select data based on identifying a corresponding initial state characteristic and then determining whether data corresponding to five years later corresponds to the required future state characteristic.

In some embodiments, the system may apply additional normalization to account for the effect of time-shifting. For example, in some embodiments, the analysis of time-series data presents comparison challenges that are exacerbated by normalization. For example, a comparison of data from the same period in each year does not completely remove all seasonal effects. Certain holidays such as Easter and Chinese New Year fall in different periods in each year, hence they will distort observations. Also, year-to-year values will be biased by any changes in seasonal patterns that occur over time. For example, consider a comparison between two consecutive March months (i.e., compare the level of the original series observed in March for 2000 and 2001). This comparison ignores the moving holiday effect of Easter. Easter occurs in April for most years but if Easter falls in March, the level of activity can vary greatly for that month for some series. This distorts the original estimates. A comparison of these two months will not reflect the underlying pattern of the data. The comparison also ignores trading day effects. If the two consecutive months of March have different composition of trading days, it might reflect different levels of activity in original terms even though the underlying level of activity is unchanged. In a similar way, any changes to seasonal patterns might also be ignored. The original estimates also contain the influence of the irregular component. If the magnitude of the irregular component of a series is strong compared with the magnitude of the trend component, the underlying direction of the series can be distorted. While data may in some cases be normalized to account for this issue, the normalization of one data stream set may affect another data stream set.

In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

For example, the system may generate an isobaric representation of the time-series prediction (e.g., (FIG. 1B)). The system may identify a predicted event (e.g., a pressure point in (FIG. 1B)) for the time-series prediction in the isobaric representation. Additionally or alternatively, the system may generate an option (e.g., recommendation 152 (FIG. 1D)) to modify the current state characteristic based on the predicted event.

In some embodiments, the system may determine a gradient for the time-series prediction. For example, the gradient of a scalar-valued differentiable function (f) of several variables is the vector field (or vector-valued function) whose value at a point (p) is the direction and rate of fastest increase. For example, the system may determine a gradient for the time-series prediction. The system may determine a magnitude of the gradient. The system may identify a predicted event for the time-series prediction based on the magnitude. For example, the time-series prediction may be represented in an isobaric graph. The system may then process the isobaric graph to determine one or more predicted events. These predicted events may comprise a local maxima or local minima of the isobaric graph. For example, if the gradient of a function is non-zero at a point (p), the direction of the gradient is the direction in which the function increases most quickly from (p), and the magnitude of the gradient is the rate of increase in that direction, the greatest absolute directional derivative. The system may determine a point in the isobaric graph in which point (p) equals zero (e.g., representing a local minimum or local maximum). For example, a point on a graph (or its associated function) whose value is less than all other points near it is a local minimum, whereas a point on a graph (or its associated function) whose value is greater than all other points near it is a local maximum. The system may detect local minimums and maximums to identify a predicted event.

Additionally or alternatively, the system may determine the severity of a predicted event based on the magnitude of the gradient. For example, the magnitude of the gradient is the rate of increase in that direction. This rate may be positive or negative. Furthermore, the larger the magnitude (e.g., the absolute value of the magnitude), the greater the effect on the system state and/or a characteristic thereof. For example, based on the magnitude (and whether it is positive or negative), the system may represent a windfall event or a personal or financial emergency that negatively affects the financial projection. For example, the system may determine an effect of the predicted event based on the magnitude. The system may generate a user recommendation based on the effect.

In some embodiments, the system may perform isotropic scaling on the time-series prediction to identify a predicted event. For example, isotropic scaling is a linear transformation that enlarges (increases) or shrinks (diminishes) objects by a scale factor that is the same in all directions. In some embodiments, the system may perform non-uniform scaling (anisotropic scaling) obtained when at least one of the scaling factors is different from the others. For example, the system may determine a scale factor for the time-series prediction. The system may perform, based on the scale factor, a linear transformation to the time-series prediction to identify a predicted event for the time-series prediction.

Figure 1C:
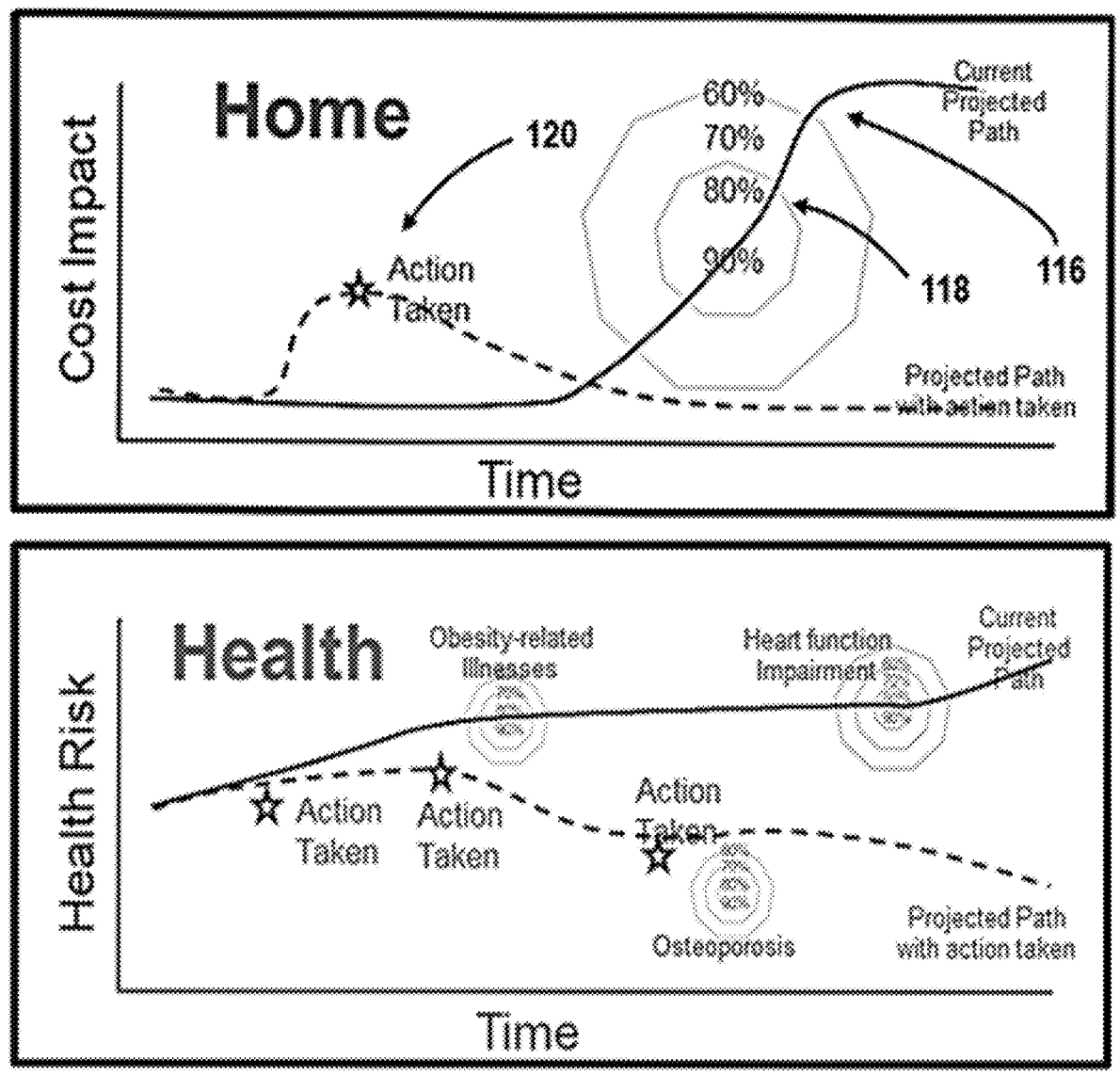
FIG. 1C shows an illustrative user interface comprising a recommendation based on an isobaric graphical representation, in accordance with one or more embodiments.

FIG. 1C shows an illustrative user interface comprising a recommendation based on an isobaric graphical representation, in accordance with one or more embodiments. For example, the system may generate time-series predictions on the first user profile data and/or any other current state data to generate multiple dimension representations of state characteristics (e.g., risk, health, financials, etc.) to determine if a time-series prediction intersects with an outlier event (e.g., a pressure point) or diverges from a desired path. The system may then provide recommendations to adjust course and track subsequent actions.

For example, as shown in FIG. 1C, the system has determined time-series prediction 116 that includes predicted event 118. For example, the system may select a second data set from a plurality of available datasets based on similarities between state characteristics for the second data set, the current state characteristic, and the required future state characteristic, wherein the second data set comprises second rate-of-change data over a second time period. That is, the system may select a second data set based on a cohort of a user.

In some embodiments, the system may use an artificial intelligence model to select a cohort of the user. For example, the system may use a model to select a cohort of the user and then select a data set corresponding to the selected cohort. For example, the system may receive historical time-series data. The system may train a second model using unsupervised learning, wherein the second model comprises a convolutional neural network. The system may select the second data set from the plurality of available datasets using the second model.

The system may compare the second rate-of-change data to a threshold rate of change to detect a rate-of-change event. This rate-of-change event may comprise an outlier event (e.g., predicted event 118) as this rate-of-change event comprises a point at which a rate of change equaled or exceeded a threshold rate of change. In response to determining time-series prediction 116 and predicted event 118, the system may provide recommendation 120 and generate time-series prediction 116. Time-series prediction 116 may represent a result of accepting recommendation 120.

For example, the system may project, based on cohort experience and event likelihood correlation, that an intersection will occur with a pressure point and the current trajectory. In some embodiments, the system may provide multiple selectable actions to the user that the user can use to alter time-series predictions. For example, the system may deliver a time-series prediction visualization of the likely outcome of the selected actions. The system may then track the actions to further enhance the model's learning. As such, the system may generate a display of the calculated projection and provide the ability to render the end-to-end path and produce a visualization of the user's path over time as it nears a pressure point. The system may also compare the initial projection to the actual course to improve learning.

In some embodiments, the system may use an artificial intelligence model to determine an effect of a rate-of-change event on a state of a system (e.g., a time-series prediction). For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

Additionally or alternatively, the system may generate modified first rate-of-change data based on the normalized rate-of-change event. For example, the modified first rate-of-change data may predict the change in a user's account over a time period after applying disruptive events. For example, the system may detect whether pressure points can be avoided by taking actions, adjusting behaviors, etc. The system may recognize the underlying causes of pressure points by analyzing the experiences of the cohort. Upon determining the cause, the system may recommend actions to influence the client's path. In some embodiments, the actions may require action and may have costs. The cost or "sacrifice" may be expressed by the system on the recommended path's movement on the Y axis of the isobar map.

Figure 1D:
FIG. 1D shows an illustrative user interface comprising recommendations based on a synthetic profile, in accordance with one or more embodiments.

FIG. 1D shows an illustrative user interface comprising recommendations based on a synthetic profile, in accordance with one or more embodiments. For example, FIG. 1D shows an illustrative recommendation that may appear on a mobile user device. In some embodiments, the system may generate recommendations in a dynamic manner. For example, the system may generate one or more recommendations in response to one or more detected triggering events.

In some embodiments, a triggering event may comprise user profile data updates that may affect a state of a system. For example, the system may detect that a user is about to make a large purchase that may cause a time-series prediction based on the resulting state of the system (e.g., a user account of the user) to be positively or negatively affected (or cause a rate-of-change event to equal or exceed a threshold rate of change). In response, the system may generate a recommendation (e.g., recommendation 152) on user interface 150.

For example, the system may deliver proactive alerts, respond to real-time performance of a structured note, and/or advise whether any action needs to be taken to mitigate any issues detected with the performance of the structured note. In some embodiments, the system may use determinations related to structured notes to dynamically adjust investment goals and objectives over time. For example, the system may act as an always-on advisor for portfolio management.

Figure 2:
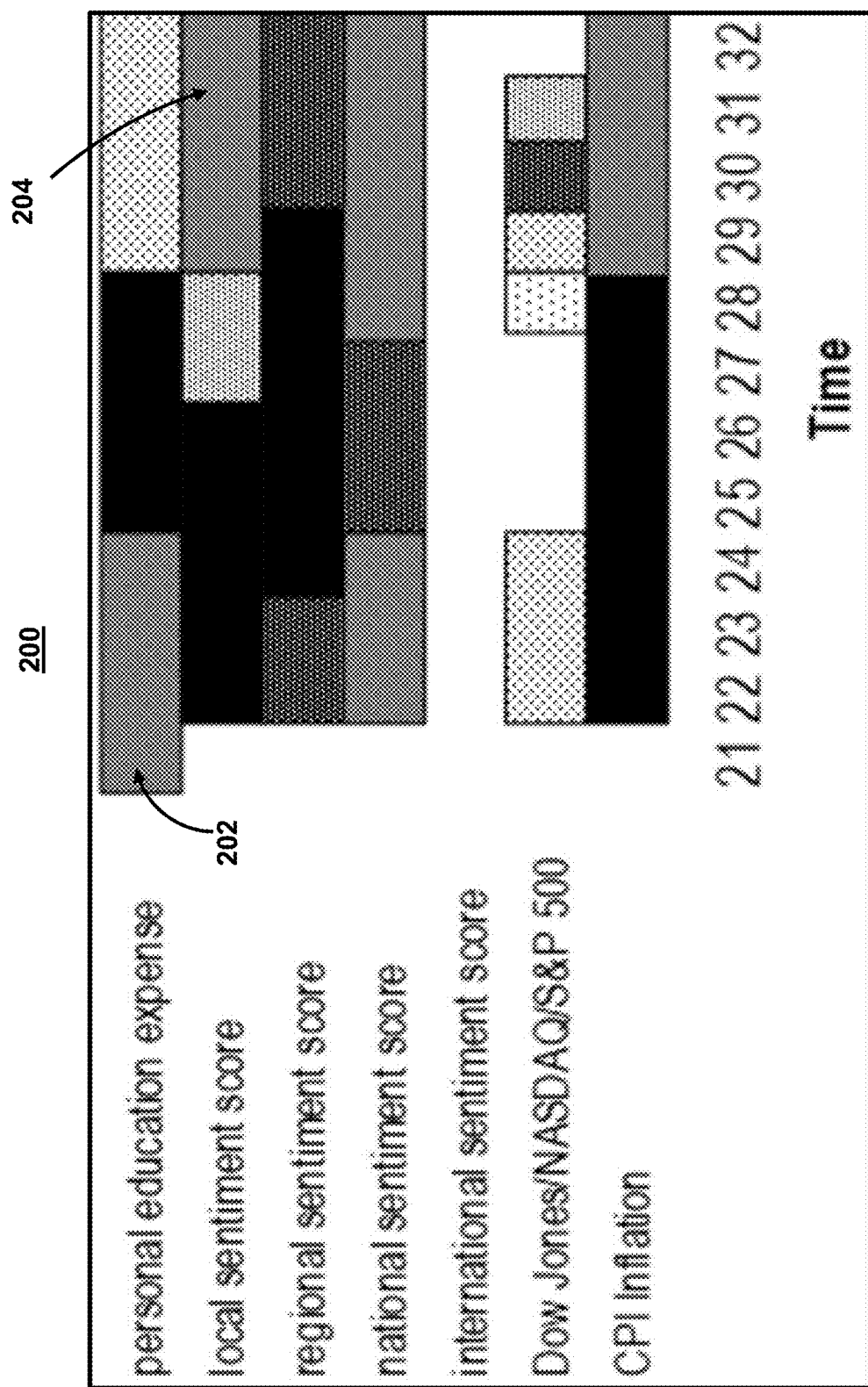
FIG. 2 shows an illustrative diagram comprising predicted rates of change over a time period, in accordance with one or more embodiments.

FIG. 2 shows an illustrative diagram comprising predicted rates of change over a time period, in accordance with one or more embodiments. For example, FIG. 2 includes diagram 200, which may indicate a likelihood of a given predicted event or outlier event based on a given characteristic. Diagram 200 indicates a likely time period and/or magnitude of a given predicted event or outlier event. For example, diagram 200 represents data that may be used to generate one or more pressure points (e.g., pressure point 112 (FIG. 1B) and pressure point 114 (FIG. 1B)). In some embodiments, diagram 200 may represent a data set corresponding to a given cohort. For example, the synthetic profile may be used to display events across time in the second data set.

In some embodiments, diagram 200 may indicate one or more edge conditions. Edge Conditions may comprise data points where the system has determined that a strong correlation exists between two or more other data points. As shown on the Y axis of diagram 200, various data points (e.g., categories of events) have been determined by the system to correlate to a rate-of-change event in terms of both a likely time and a likely magnitude. For example, point 202 indicates a low magnitude/likelihood of an outlier event (e.g., a pressure point) at time "22" (e.g., corresponding to a user age of twenty-two) and an outlier event with a large magnitude (e.g., indicating a low likelihood of a user marrying at that time and/or such an outlier event having a large effect on a rate of change of the state of the system). In contrast, point 204 indicates a high magnitude/likelihood of an outlier event (e.g., a pressure point) at time "42" (e.g., corresponding to a user age of forty-two) and an outlier event with a large magnitude (e.g., indicating a high likelihood of a user having a child expense at that time and/or such an outlier event having a large effect on a rate of change of the state of the system).

As shown in diagram 200, there are both "negative" and "positive" edge conditions that may have positive or negative effects on a rate of change of the state of the system. In some embodiments, the system may determine an edge condition and/or its effect. Based on its effect (e.g., magnitude), the system may select a threshold rate. Additionally or alternatively, the system may determine whether or not a user may be affected by an edge condition based on user profile data. For example, the system may determine whether or not a user is likely to approach an age and/or may otherwise likely be affected by an edge condition. For example, the system may determine based on data about the user that the user is likely to experience an event of a given type. For example, the system may retrieve user profile data. The system may determine the event type based on the user profile data. To detect the edge conditions, the system may compare the second rate-of-change data to a threshold rate of change. For example, the system may detect predicted events in the system state based on large changes in the rate of change of the user account. These large charges may correspond to external events such as a marriage, death, divorce, market downturn, etc.

Figure 3A:
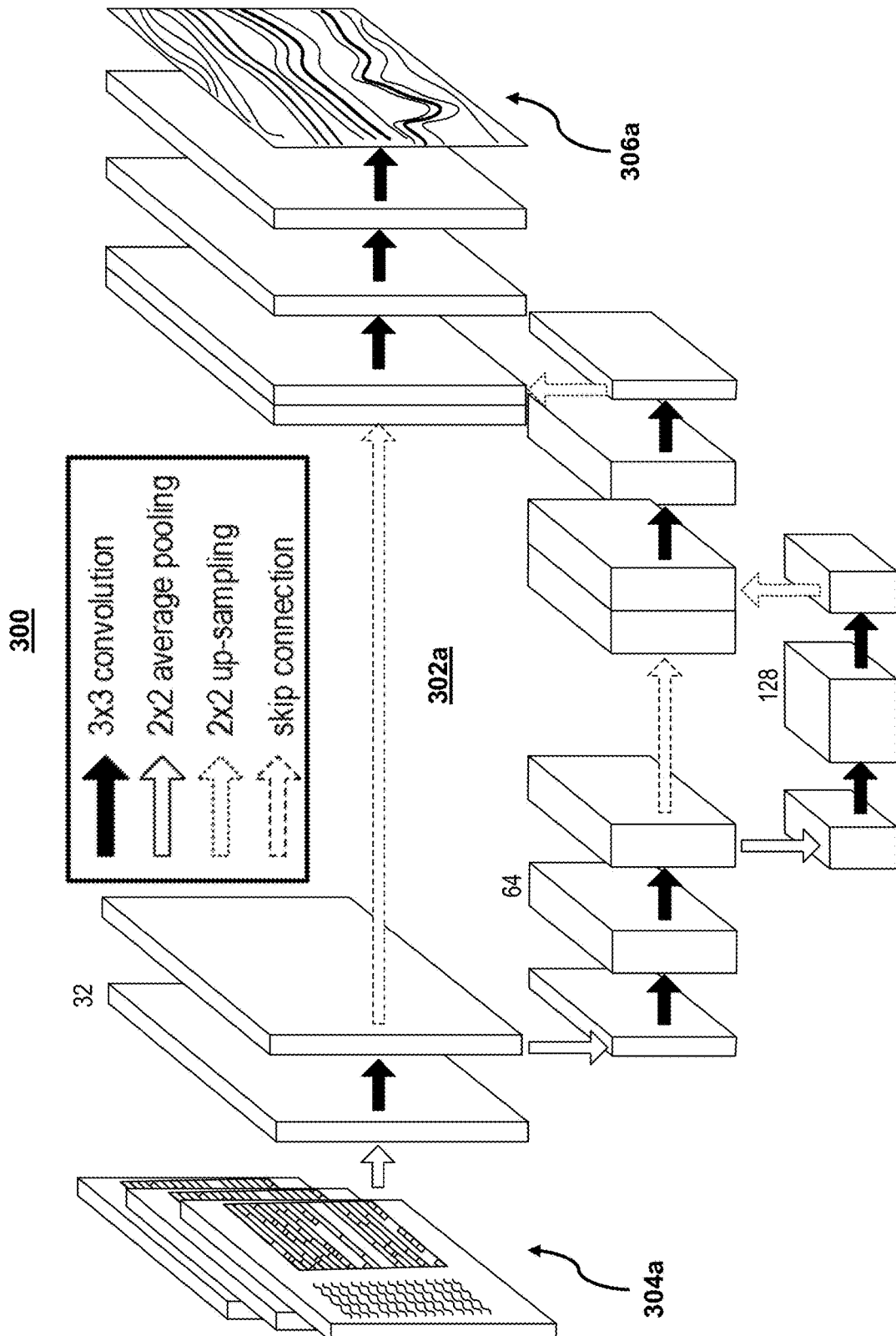
FIGS. 3A-B show illustrative models for a system used to generate recommendations based on a synthetic profile, in accordance with one or more embodiments.
Figure 3B:
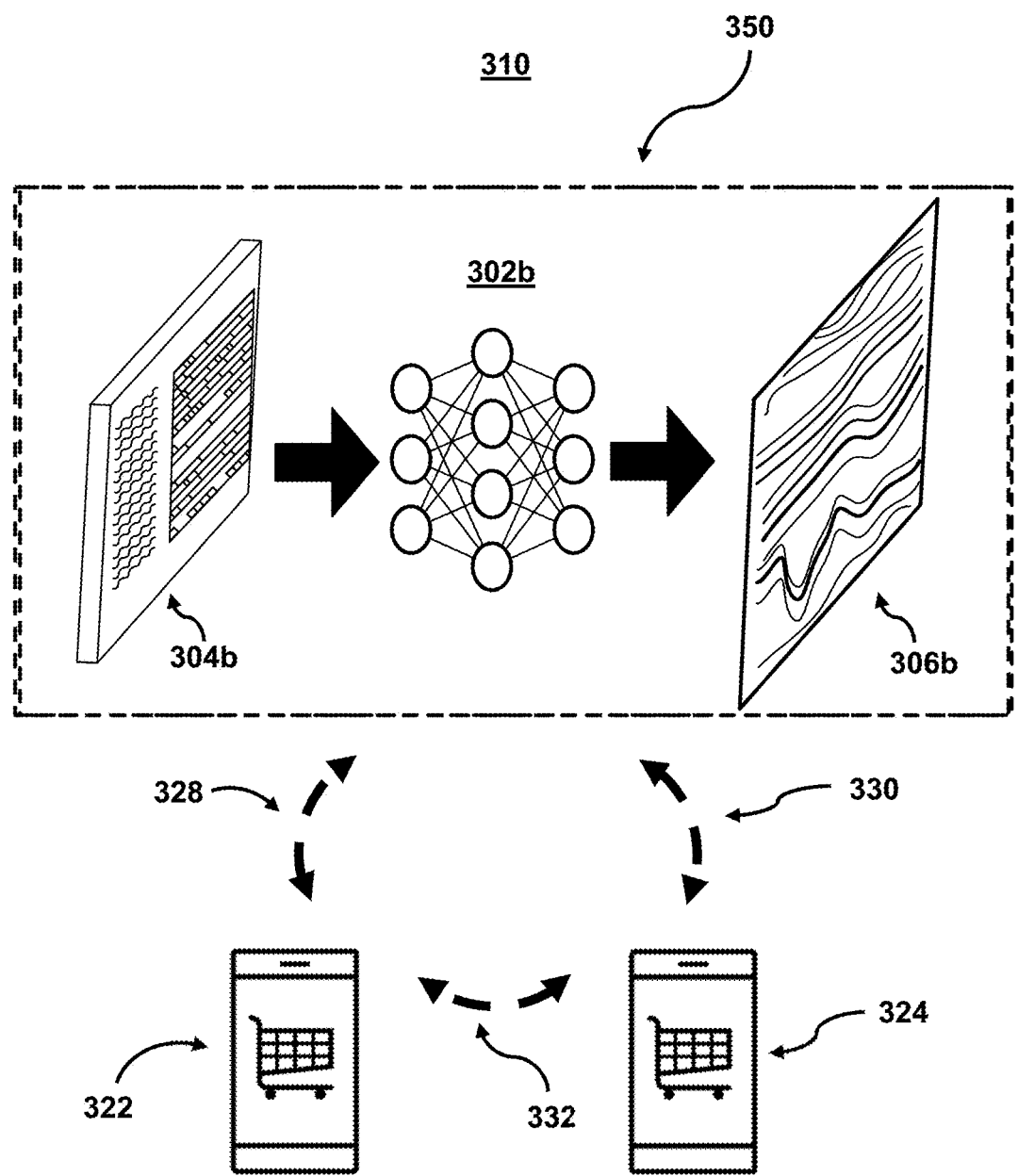

FIGS. 3A-B show illustrative models for a system used to generate recommendations based on a synthetic profile, in accordance with one or more embodiments. For example, FIG. 3A includes system 300. System 300 includes model 302a, which may be a machine learning model, artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., select a second data set from a plurality of available datasets based on similarities between state characteristics for the second data set and the current state characteristic and the required future state characteristic).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to select a second data set from a plurality of available datasets based on similarities between state characteristics for the second data set and the current state characteristic, and the required future state characteristic.

Model 302a is shown as a convolutional neural network. A convolutional neural network consists of an input layer (e.g., input 304a), hidden layers, and an output layer (e.g., output 306a). As shown in FIG. 3A, the middle layers are called hidden because their inputs and outputs are masked by the activation function and final convolution (e.g., convolutions of 32, 64, and 128). For example, each convolution may comprise an array of weights, which represent part of the input. While each may vary in size, the filter size may comprise a matrix that determines the size of the receptive field. The filter is then applied to an area of the input, and a dot product is calculated between the input pixels and the filter. This dot product is then fed into an output array.

In a convolutional neural network, the hidden layers include layers that perform convolutions. Model 302a may comprise convolutional layers that convolve the input and pass its result to the next layer. Model 302a may also include local and/or global pooling layers along with traditional convolutional layers. Pooling layers reduce the dimensions of data by combining the outputs of neuron clusters at one layer into a single neuron in the next layer. Also as shown, model 302a may comprise fully connected layers that connect every neuron in one layer to every neuron in another layer.

FIG. 3B includes system 310. As shown in FIG. 3B, in some embodiments, system 310 may comprise one or more components of system 300 (FIG. 3A). For example, system 310 may comprise model 302b, which may have been trained by taking inputs 304b and providing outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem-solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, backpropagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., select a second data set from a plurality of available datasets based on similarities between state characteristics for the second data set and the current state characteristic, and the required future state characteristic).

FIG. 3B also illustrates components for generating recommendations based on a synthetic profile. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a handheld computer, and other computer equipment (e.g., a server), including "smart," wireless, wearable, and/or mobile devices. System 300 may also include cloud components. For example, cloud components may be implemented as a cloud computing system and may feature one or more component devices. It should be noted that, while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of mobile device 322 and mobile device 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front end and back end. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
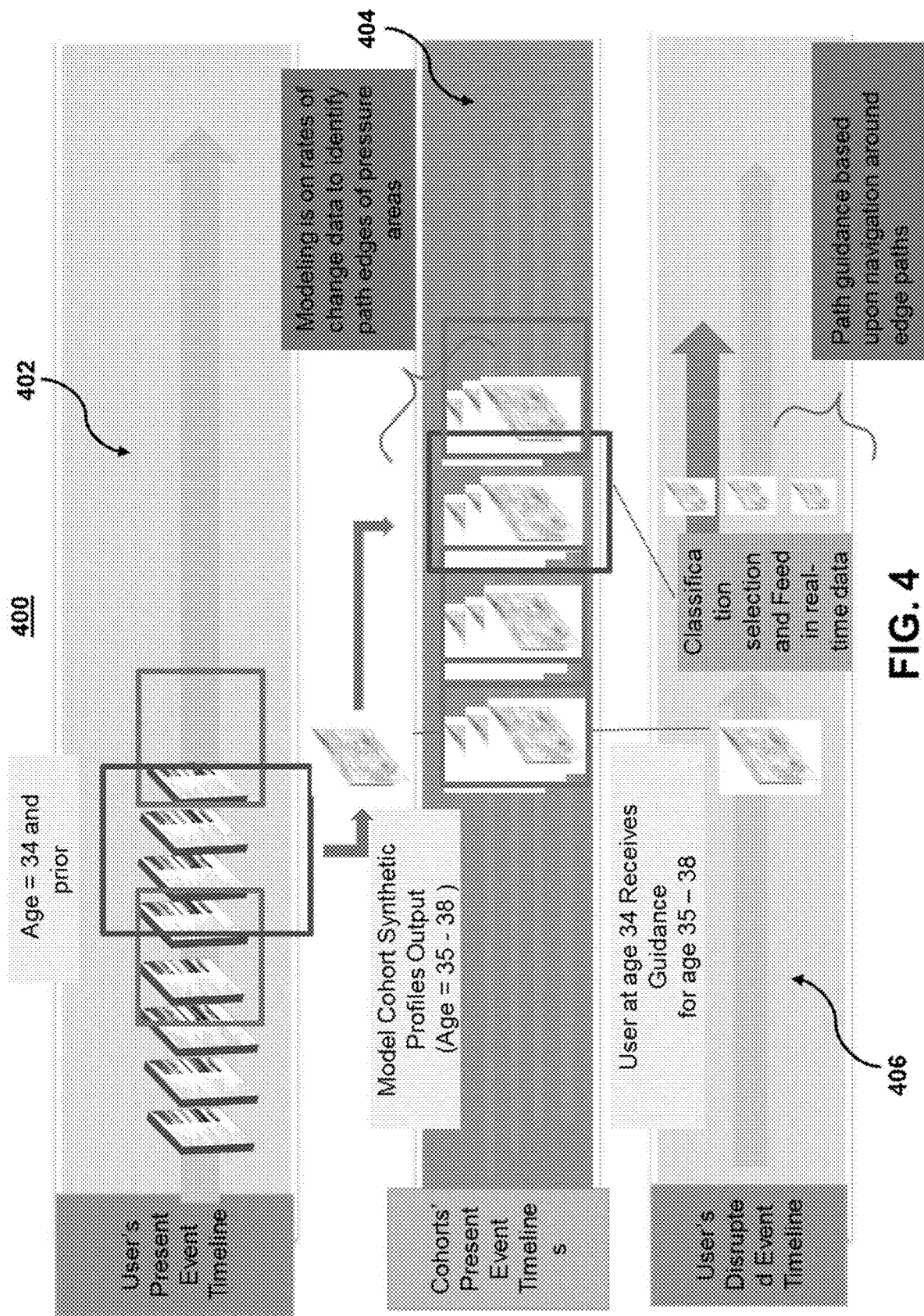
FIG. 4 shows a diagram for creating synthetic profiles, in accordance with one or more embodiments.

FIG. 4 shows a diagram for creating synthetic profiles, in accordance with one or more embodiments. For example, diagram 400 may represent a system workflow for responding to events based on predictions in time-series data. For example, the systems and methods may detect significant events (e.g., identify and measure discrete and non-discrete rates of change in time-series data beyond a contextually relevant common threshold) that represent predicted significant events (e.g., predicted instances in first time-series data in which first rates of change over a first time period are beyond the contextually relevant threshold). Based on these predictions, the system may provide recommendations for changes in existing system states that may mitigate the effects and/or occurrence of these predicted events (e.g., provide recommended changes to current system state characteristics in order to mitigate predicted rates of change over a first time period in the first time-series data). Furthermore, these recommendations may be based on non-obvious positive and negative events that are time-based and contextually relevant to a given individual/entity.

For example, diagram 400 may represent three stages of predicting events using synthetic profiles. For example, stage 402 may represent processing a first data set. For example, the system may receive a first data set comprising a current state characteristic for a first system state. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc.

For example, the system may predict how a rate of change in time-series data (e.g., representing a current growth trajectory of the state) may be altered throughout the first time period. That is, the system may determine a current trajectory of the state based on current characteristics. For example, in the automated home office example, the system may determine a current trajectory of a portfolio of a user based on current characteristics (e.g., size of the portfolio, distributions within the portfolio, diversity in assets of the portfolio, etc.). However, as noted above, correctly predicting an occurrence of a significant event (which may comprise outliers to the normal trajectory), and in particular characteristics about these significant events (e.g., when an event may occur, what may be a source of the event, what rate of change the event may cause, etc.) presents a technical challenge. To overcome this technical challenge, the system may generate predictions based on non-homogenous data. For example, while the system may use a first data set to determine a trajectory of a current state, the system may then use a different data set to predict the occurrence and/or effect of the outlier events. For example, the system may determine when an event occurs, the effects of which may move a predicted trajectory outside the edge boundaries of the current trajectory. With respect to the automated home office example, this event may represent a windfall event that positively effects the portfolio (and/or its trajectory) or an emergency that negatively effects the portfolio (and/or its trajectory).

Stage 404 may represent detecting a cohort for the user for generating a synthetic profile upon which events may be predicted. The synthetic profile may be used to display events across time in the second data set (e.g., as shown in FIG. 2). For example, the system may select a second data set from a plurality of available datasets based on similarities between state characteristics for the second data set and the current state characteristic, and the required future state characteristic, wherein the second data set comprises second rate-of-change data over a second time period. The second data set may comprise account data for another user. The similarities in the state characteristics may include current and future positions, values, expectations, etc. The system may use the similarities to determine a cohort for the first user. In some embodiments, the system may process numerous datasets to identify predicted events and average information about them.

In some embodiments, the system selects a second data set (i.e., a non-homogenous data set) that comprises actual (i.e., not predicted) data, creating a synthetic profile. For example, the system may use a first data set to determine a trajectory of a current state at stage 402. The system may then use a different data set to predict the occurrence of an outlier event and/or its effect in stage 404. For example, the system may select a second data set (i.e., a non-homogenous data set) comprising actual (i.e., not predicted) data, thus creating a "synthetic profile." The actual data found in the synthetic profile may comprise historic time-series data in which the historic time-series data indicates historic rates of change over a given time period. Furthermore, the system may filter the historic data set that is used based on similarities between the current state characteristics and/or required future state characteristics of the first system at the end of the first time period. That is, the system may select a second data set from a plurality of historic datasets based on the second data set having certain characteristics (e.g., similar state characteristics at the beginning or ending of a selected time period, similar trajectories, similar user profiles of users upon which the state is based, etc.). The system may then analyze the second data set for potentially significant events (e.g., events corresponding to a rate of change beyond a threshold).

As shown in stage 404, the system may normalize data by time-shifting cohort data. For example, the cohort data may comprise data that is multiple years beyond the data in the first data set. The system may then normalize this data by time-shifting any predicted event. For example, the system may generate a normalized rate-of-change event by normalizing the rate-of-change event based on the first data set. For example, the system may normalize the rate-of-change event by time-shifting the date of occurrence, adjusting a magnitude based on inflation, etc.

As such, the system alleviates issues, if any, resulting from the differences in the non-homogenous data, and the information (e.g., time, magnitude, and/or other characteristics) about predicted events is normalized to correspond to the characteristics of the first data set. In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

For example, as shown in FIG. 4, data in the second data set predicts events that may occur during the ages of 35-38 of a user that is currently 34. For example, the second data set may comprise data from one or more other users that reflects events that occurred (and/or the effects thereof) during the ages of 35-38 for those users. The system normalizes the predicted event to occur in corresponding years for the user from the beginning of the first time period (even if the first time period and the second time period began at different times). For example, if an event is predicted in the second data set to occur at age 36, the system may normalize this to the first user as likely to occur in two years.

The first feature input is then submitted to an artificial intelligence model that is trained to predict first rates of change over a first time period. The previously identified predictions (e.g., corresponding to a predicted event and/or characteristics of the event) are then applied to first rates of change over the first time period to generate recommendations for responding to the predicted events (e.g., recommending to maintain a current state, recommending to modify a state in a particular manner, etc.).

Stage 406 may represent determined effects of events (predicted by the synthetic profile) on the first data and/or provide a recommendation for responding to the effects of the predicted event (e.g., by maintaining a current trajectory of the state or changing a trajectory of the state). For example, the system may input the first data set into a first model to generate first rate-of-change data over a first time period for the first system state. For example, the first model may predict the change in a user's account over a time period without any significant events.

In some embodiments, the system may use an artificial intelligence model to determine an effect of a rate-of-change event on a state of a system. For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

For example, the system may generate modified first rate-of-change data based on the normalized rate-of-change event. For example, the modified first rate-of-change data may predict the change in a user's account over a time period after applying disruptive events. For example, the system may generate for display, on a user interface, a recommendation based on the modified first rate-of-change data. For example, a recommendation may include new holdings, positions, investments, etc. to mitigate the disruptive events. In some embodiments, the recommendation may comprise an isobaric graphical representation. Alternatively or additionally, the recommendation comprises an option to adjust the current state characteristic. For example, the system may recommend that a user adjust one or more current state characteristics to mitigate a detected event.

By training the artificial intelligence model or models on both the first and second data sets, the system mitigates the problem with low amounts of high-quality data (e.g., the system maximizes the amount of training data available). Secondly, by using the actual data from the second data set (e.g., indicating past events), the system mitigates potential precision and accuracy issues in relying on an artificial intelligence model to predict outlier events to a trajectory of the time-series data and/or characteristics about the outlier events. By combining the normalized predicted events data with the first data set, the system generates predictions based on the state of the first data set, but with predicted events occurring at the normalized time and having the normalized magnitude.

Figure 5:
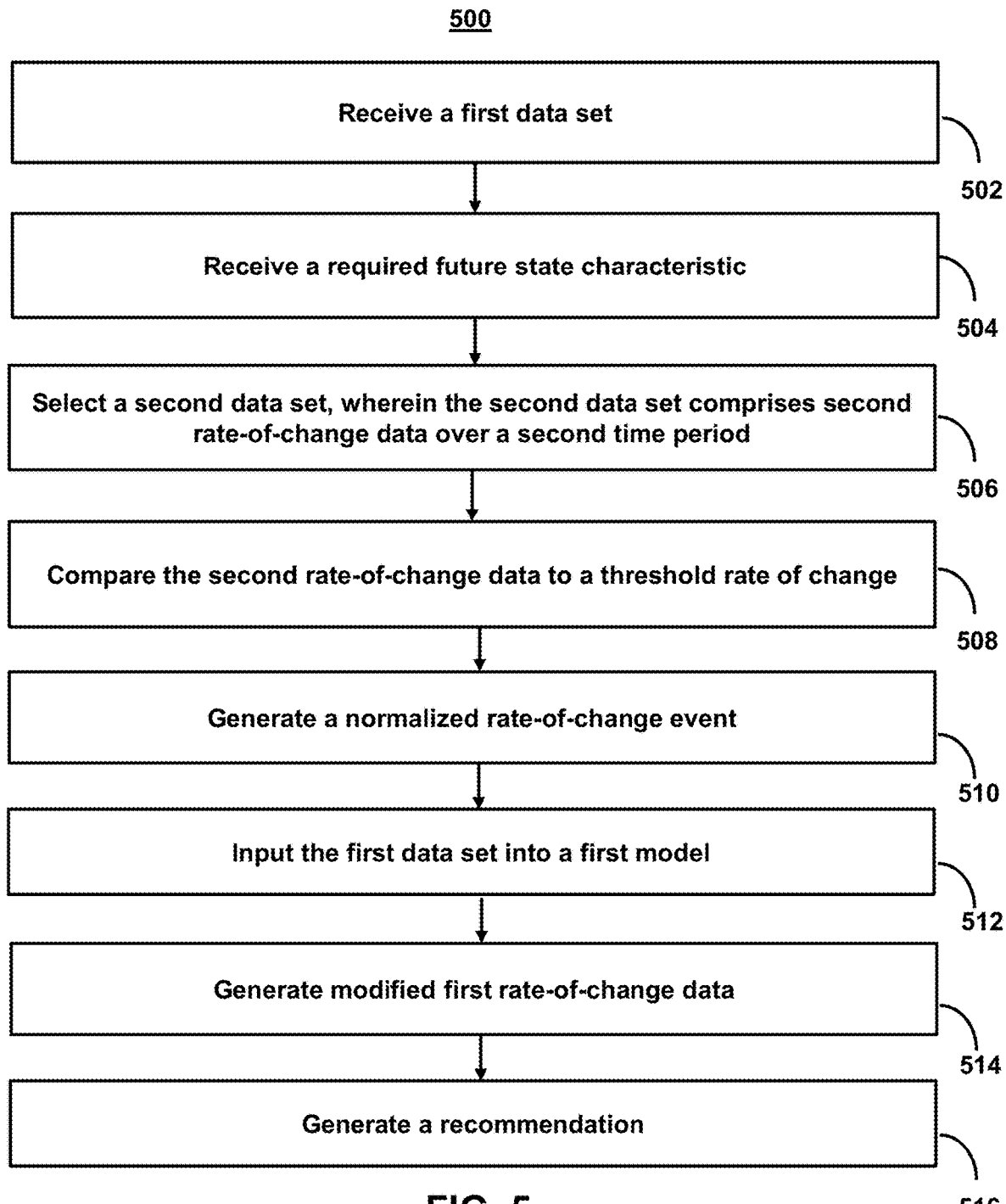
FIG. 5 shows a flowchart of the steps involved in responding to predicted events in computer systems, in accordance with one or more embodiments.

FIG. 5 shows a flowchart of the steps involved in responding to predicted events in computer systems based on predicted events in time-series data, in accordance with one or more embodiments. For example, the system may use process 500 (e.g., as implemented on one or more system components described above) in order to mitigate events in computer systems based on predicted events in time-series data using artificial intelligence models trained on non-homogenous time-series data.

At step 502, process 500 (e.g., using one or more components described above) receives a first data set. For example, the system may receive a first data set comprising a current state characteristic for a first system state. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc.

In some embodiments, the system may apply one or more types of data conditioning to one or more data sets. For example, data visualization is an important step in analysis of a data set. Plotting large time-series data however generates large file sizes, which may slow down user interactions and strain computing resources. Accordingly, the system may condition data in a data set by applying a compression algorithm. For example, the system may receive a raw time-series data. The system may generate a data set by applying a compression algorithm to the raw time-series data.

In some embodiments, the system may compress data using midimax compression. Midimax compression involves determining the minimum, median, and maximum points of segments of the raw time-series data. Notably, midimax compression only returns a subset of the original raw time-series data, so there is no averaging, median interpolation, regression, and statistical aggregation. Accordingly, midimax compression avoids statistical manipulations on the underlying data when plotting. For example, the system may receive raw time-series data. The system may determine minimum, median, and maximum points in segments of the raw time-series data. The system may generate a data set based on the minimum, median, and maximum points.

Midimax compression may reduce data sizes such that large time-series plots may be processed quickly and consume fewer computing resources. Furthermore, while conventional compression algorithms may remove data, creating bias, midimax compression maintains general trends rather than small noise. Accordingly, midimax compression may capture the variations in the raw data set using a smaller number of points and to process larger data sets more quickly.

To perform a midimax compression, the system may receive an input of the raw time-series data and a compression factor (e.g., a float number). For example, the system may receive raw time-series data and receive a compression factor. The system may segment the raw time-series data into data segments. For example, the system may split the raw time-series data into non-overlapping segments of equal size where the size is calculated as: segment_size=floor (3*compression factor). By using the compression factor of three, the system determines minimum, median, and maximum values taken from each segment. The system may sort values in each of the data segments. For example, the system may sort the values in each segment in ascending order. The system may select respective minimum and maximum values from the values in each of the data segments. For example, by selecting the first and last values for the min and max values, the system maximizes the variance and retains the most information in the compression. The system may determine a respective median value for each of the data segments based on the respective minimum and maximum values. For example, the system may determine the median by selecting a middle value for the median, where the middle position is defined as med_index=floor(segment_size/2). The system may re-sort the respective median value for each of the data segments. For example, the system may re-sort the selected points by the original index, which may be time stamped.

In some embodiments, the system may apply one or more types of data conditioning to one or more data sets. For example, data visualization is an important step in analysis of a data set. Plotting large time-series data however generates large file sizes, which may slow down user interactions and strain computing resources. Accordingly, the system may condition data in a data set using fractal synthesis optimizations. Fractal synthesis may include application of a regularization. For example, the system may receive raw time-series data. The system may generate a data set by applying a fractal synthesis algorithm to the raw time-series data.

For example, regularization is used to reduce an error in a data model by fitting a function appropriately on the given training set and avoiding overfitting. The system may receive raw time-series data. The system may apply a regularization to the raw time-series data to determine a function for the raw time-series data. The system may generate a data set based on the function.

At step 504, process 500 (e.g., using one or more components described above) receives a required future state characteristic. For example, the system may receive a required future state characteristic for the first system state. For example, the "required future state characteristic" may comprise a given rate of return, a total value of the account, etc. for the user account.

At step 506, process 500 (e.g., using one or more components described above) selects a second data set, wherein the second data set comprises second rate-of-change data over a second time period. For example, the system may select a second data set from a plurality of available datasets based on similarities between state characteristics for the second data set and the current state characteristic, and the required future state characteristic, wherein the second data set comprises second rate-of-change data over a second time period. The second data set may comprise account data for another user. The similarities in the state characteristics may include current and future positions, values, expectations, etc. The system may use the similarities to determine a cohort for the first user.

In some embodiments, the system selects a second data set (i.e., non-homogenous data) comprising actual (i.e., not predicted) data, creating a synthetic profile. For example, the actual data found in the synthetic profile comprises second time-series data in which the second time-series data indicates second rates of change over a second time period. The system may select the second data set (or a plurality of data sets) based on similarities between the current state characteristics and/or required future state characteristics of the first system at the end of the first time period. The system may then analyze the second data set for predicted events (e.g., a rate of change beyond a threshold).

In some embodiments, the system may use an artificial intelligence model to select a cohort of the user. For example, the system may use a model to select a cohort of the user and then select a data set corresponding to the selected cohort. For example, the system may receive historical time-series data. The system may train a second model using unsupervised learning, wherein the second model comprises a convolutional neural network. The system may select the second data set from the plurality of available datasets using the second model.

At step 508, process 500 (e.g., using one or more components described above) compares the second rate-of-change data to a threshold rate of change. For example, the system may compare the second rate-of-change data to a threshold rate of change to detect a rate-of-change event. For example, the system may detect events in the system state based on large changes in the rate of change of the user account. These large charges may correspond to external events such as a marriage, death, divorce, market downturn, etc.

In some embodiments, the system may determine an edge condition. Edge conditions are data points where the system has determined that a strong correlation exists between two or more other data points. For example, the system may determine an event type for the rate-of-change event. The system may determine the threshold rate based on the event type.

The system may determine based on data about the user that the user is likely to experience an event of a given type. For example, the system may retrieve user profile data. The system may determine the event type based on the user profile data.

At step 510, process 500 (e.g., using one or more components described above) generates a normalized rate-of-change event. For example, the system may generate a normalized rate-of-change event by normalizing the rate-of-change event based on the first data set. For example, the system may normalize the rate-of-change event by time-shifting the date of occurrence, adjusting a magnitude based on inflation, etc.

In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

At step 512, process 500 (e.g., using one or more components described above) inputs the first data set into a first model. For example, the system may input the first data set into a first model to generate first rate-of-change data over a first time period for the first system state. For example, the first model may predict the change in a user's account over a time period without any disruptive events.

In some embodiments, the system may use an artificial intelligence model to determine an effect of a rate-of-change event on a state of a system. For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

At step 514, process 500 (e.g., using one or more components described above) generates modified first rate-of-change data. For example, the system may generate modified first rate-of-change data based on the normalized rate-of-change event. For example, the modified first rate-of-change data may predict the change in a user's account over a time period after applying disruptive events.

At step 516, process 500 (e.g., using one or more components described above) generates a recommendation. For example, the system may generate for display, on a user interface, a recommendation based on the modified first rate-of-change data. For example, the recommendation may include new holdings, positions, investments, etc. to mitigate the disruptive events. In some embodiments, the recommendation may comprise an isobaric graphical representation. Alternatively or additionally, the system recommendation comprises an option to adjust the current state characteristic. For example, the system may recommend that a user adjust one or more current state characteristics to mitigate a detected event.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
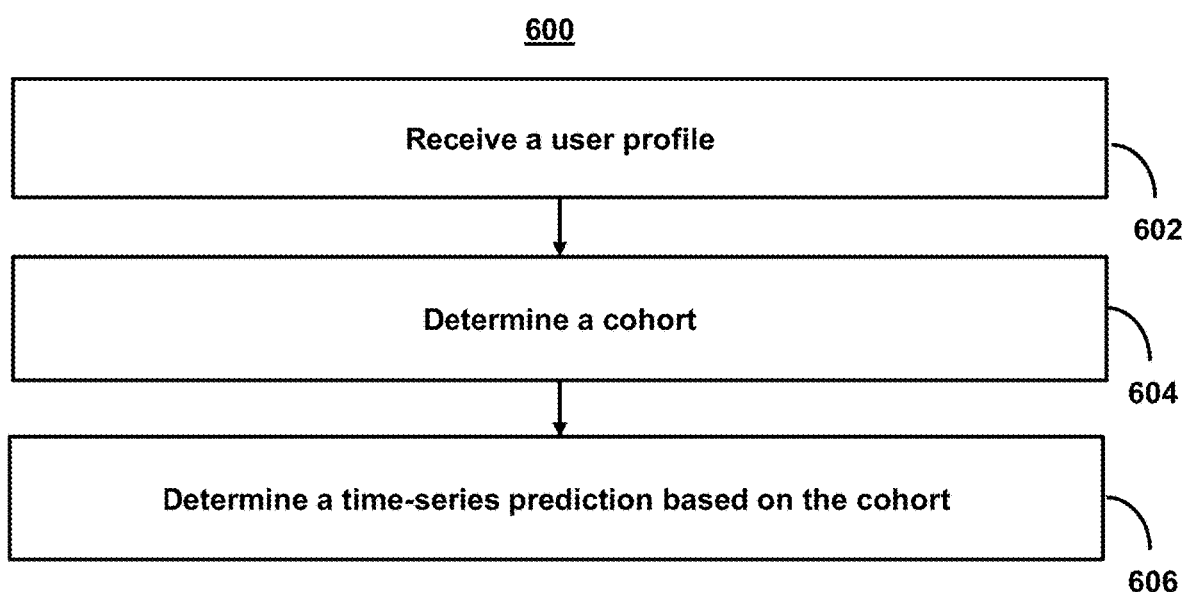
FIG. 6 shows a flowchart of the steps involved in generating time-series predictions using artificial intelligence models based on cohort clusters, in accordance with one or more embodiments.

FIG. 6 shows a flowchart of the steps involved in generating time-series predictions using artificial intelligence models based on cohort clusters, in accordance with one or more embodiments. For example, process 600 may represent the steps taken by one or more devices as shown herein when generating time-series predictions using artificial intelligence models based on cohort clusters.

At step 602, process 600 (e.g., using one or more components described herein) receives a user profile. For example, the system may receive user profile data via a user interface (e.g., user interface 100 (FIG. 1A)). The system may then determine a likely cohort of the user in order to generate one or more time-series predictions based on that cohort. The user profile may compile data through various forms such as speech commands, textual inputs, and/or responses to system queries, and/or other user profiles. In each case, the system may aggregate information about a current state of the system, information about the user, and/or other circumstances related to the user profile (e.g., time of day, previous user profiles, current account settings, etc.) in order to determine a likely cohort of the user.

At step 604, process 600 (e.g., using one or more components described herein) determines a cohort of a user using artificial intelligence models based on cohort clusters. For example, the methods and systems may include a first artificial intelligence model, wherein the first artificial intelligence model is trained to cluster a plurality of separate time-series data streams into a plurality of cohort clusters (e.g., through unsupervised hierarchical clustering). For example, as opposed to manually grouping potential cohorts, the system may train an artificial intelligence model to identify common user characteristics that correspond to a group of cohorts. Accordingly, the system may generate cohort clusters that provide access to separate time-series data streams and may be represented (e.g., in a user interface) by a single predicted event. The methods and systems may also use a second artificial intelligence model, wherein the second artificial intelligence model is trained to select a subset of the plurality of cohort clusters from the plurality of cohort clusters based on a first feature input, and wherein each cohort cluster of the plurality of cohort clusters corresponds to a respective cohort of users having similar current state characteristics. For example, the system may need to limit the number of predicted events that appear in a given response to those determined to be most relevant and/or most likely to occur to a user.

At step 606, process 600 (e.g., using one or more components described herein) generates a time-series prediction based on the cohort of the user. For example, by using artificial intelligence models based on cohort clusters, the system may also increase the likelihood that cohort clusters provide a correct specific cohort of the user as the system determines only a subset of predicted events and the user selects the predicted event matching his/her cohort. For example, the system may generate a time-series prediction (e.g., as shown in FIGS. 1B-C) and present the response in a user interface (e.g., as shown in FIGS. 1B-C). The response may appear with one or more likely responses (e.g., recommendation 152 (FIG. 1D)). In some embodiments, the system may receive a user action selecting (or not selecting) a response (e.g., recommendation 152 (FIG. 1D)) from a user interface.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
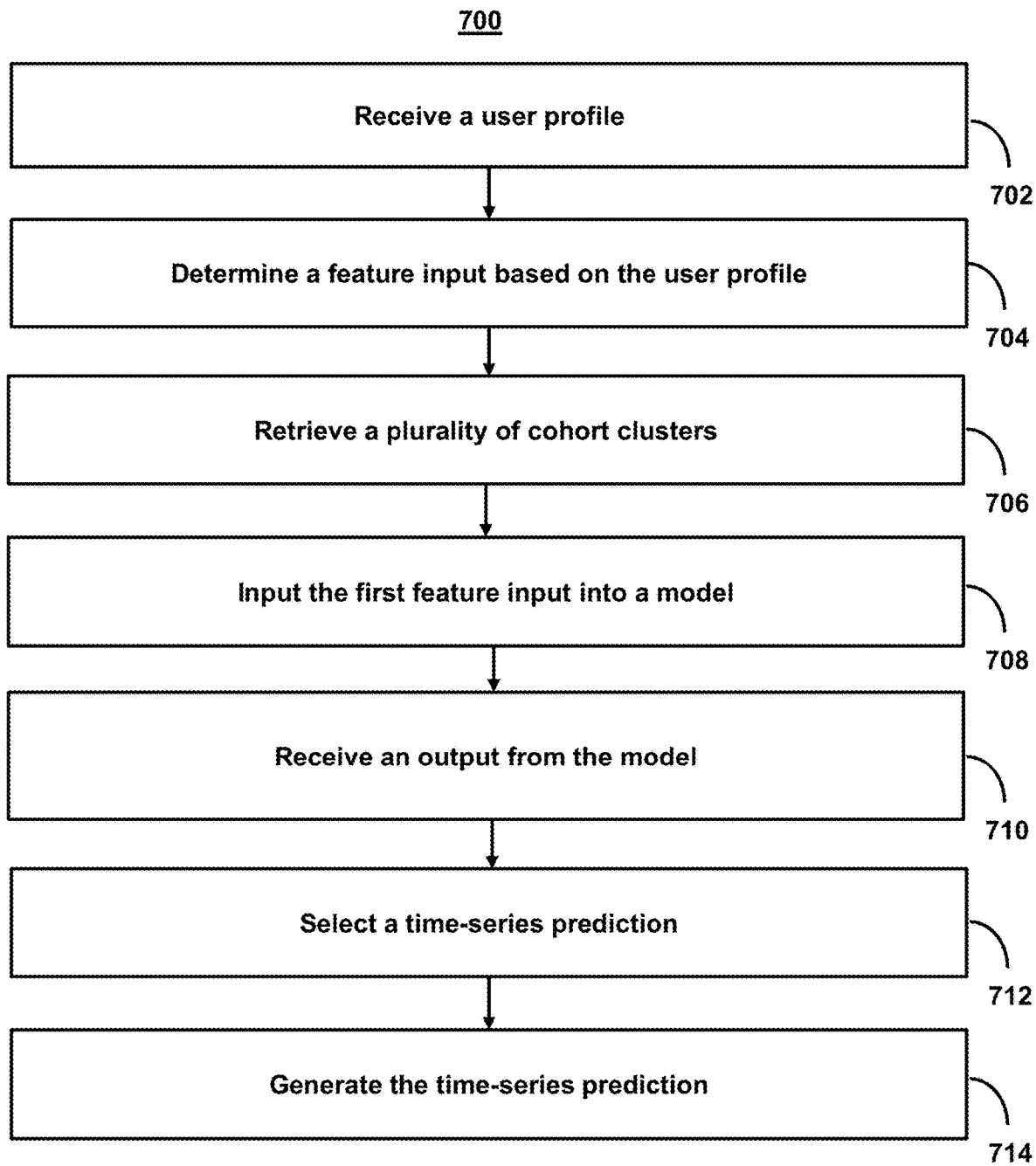
FIG. 7 shows a flowchart of the steps involved in using cohort-based predictions in clustered time-series data in order to detect significant rate-of-change events, in accordance with one or more embodiments.

FIG. 7 shows a flowchart of the steps involved in using cohort-based predictions in clustered time-series data in order to detect significant rate-of-change events, in accordance with one or more embodiments. For example, process 500 may represent the steps taken by one or more devices as shown herein when generating time-series predictions.

At step 702, process 700 (e.g., using one or more components described herein) receives a user profile. For example, the system may receive a first user profile, wherein the user profile comprises a current state characteristic. In some embodiments, the system may determine one or more user characteristics that are important to determine a cohort of the user. For example, when determining the first feature input based on the first user profile, the system may determine a subset of current state characteristics for generating a first feature input based on the current state characteristic. The system may then populate the first user profile with the subset of state characteristics. The system may, in response to receiving the first user profile, determine a first feature input based on the subset of state characteristics.

In some embodiments, the system may need to determine the values of these characteristics and/or retrieve these user characteristics from a remote location. In such cases, the system may crawl the Internet for data related to one or more characteristics. For example, when populating the first user profile with the subset of state characteristics, the system may crawl the Internet for a remote server comprising the subset of state characteristics. The system may retrieve the subset of state characteristics from the remote server.

In some embodiments, the system may determine one or more user characteristics that are important to determine a cohort of the user based on a user selection. For example, the system may receive, at the user interface, a user selection of the current state characteristic. The system may determine to use the current state characteristic for the first feature input based on the first feature input.

At step 704, process 700 (e.g., using one or more components described herein) determines a feature input based on the first user profile. For example, the system may determine a first feature input based on the first user profile in response to receiving the first user profile. In some embodiments, the first feature input may be a conversational detail or information from a user account of the user. In some embodiments, the first feature input may be based on a current state of a system at the time that the user interface (e.g., user interface 100 (FIG. 1A)) was launched.

At step 706, process 700 (e.g., using one or more components described herein) retrieves a plurality of cohort clusters. For example, the system may retrieve a plurality of cohort clusters, wherein the plurality of cohort clusters is generated by a first artificial intelligence model that is trained to cluster a plurality of separate time-series data streams into the plurality of cohort clusters through unsupervised hierarchical clustering. For example, in some embodiments, the first artificial intelligence model is trained to cluster the plurality of separate time-series data streams into the plurality of cohort clusters through unsupervised hierarchical clustering into hierarchies of correlation-distances between separate time-series data streams. For example, the system may generate a matrix of pairwise correlations corresponding to the plurality of separate time-series data streams and cluster the plurality of separate time-series data streams based on pairwise distances.

For example, in some embodiments, the system may receive a first labeled feature input, wherein the first labeled feature input is labeled with a known cohort cluster for the first labeled feature input, and train the second artificial intelligence model to classify the first labeled feature input with the known cohort cluster.

At step 708, process 700 (e.g., using one or more components described herein) inputs the first feature input into an artificial intelligence model. For example, the system may input the first feature input into a second artificial intelligence model, wherein the second artificial intelligence model is trained to select a subset of the plurality of cohort clusters from the plurality of cohort clusters based on the first feature input, and wherein each cohort cluster of the plurality of cohort clusters corresponds to a respective cohort of users having similar current state characteristics. In some embodiments, the system may select the second artificial intelligence model, from a plurality of artificial intelligence models, based on the plurality of cohort clusters that are retrieved. For example, the system may select different second artificial intelligence models based on the number and/or configuration of the cohort clusters. For example, the system may determine that some artificial intelligence models may be better suited for selecting a subset of the cohort clusters.

In some embodiments, the system may select the subset of the plurality of cohort clusters based on a screen size of a device generating the user interface. For example, the system may determine, based on the time period, model type, device type upon which a user interface is accessed, and/or format, a number, length, or size of a time-series prediction and/or predicted event in a time-series prediction.

At step 710, process 700 (e.g., using one or more components described herein) receives an output from the artificial intelligence model. For example, the system may receive an output from the second artificial intelligence model.

At step 712, process 700 (e.g., using one or more components described herein) selects a time-series prediction. For example, the system may select, based on the output, a time-series prediction from a plurality of time-series predictions, wherein each of the plurality of time-series predictions comprises a respective predicted event, and wherein each cohort cluster of the subset of the plurality of cohort clusters corresponds to a respective cohort of users having similar current state characteristics.

At step 714, process 700 (e.g., using one or more components described above) generates the time-series prediction. For example, the system may generate, at the user interface, the time-series prediction. In some embodiments, the time-series prediction may be displayed in a textual, graphical, and/or mix thereof (e.g., as shown in user interface 140 (FIG. 1C)). For example, the system may generate an isobaric representation of the time-series prediction (e.g., graph 116 (FIG. 1B)). The system may identify a predicted event (e.g., pressure point 112 (FIG. 1B)) for the time-series prediction in the isobaric representation. Additionally or alternatively, the system may generate an option (e.g., recommendation 152 (FIG. 1D)) to modify the current state characteristic based on the predicted event.

In some embodiments, the system may determine a gradient for the time-series prediction. For example, the gradient of a scalar-valued differentiable function (f) of several variables is the vector field (or vector-valued function) whose value at a point (p) is the direction and rate of fastest increase. For example, the system may determine a gradient for the time-series prediction. The system may determine a magnitude of the gradient. The system may identify a predicted event for the time-series prediction based on the magnitude. For example, the time-series prediction may be represented in an isobaric graph. The system may then process the isobaric graph to determine one or more predicted events. These predicted events may comprise a local maximum or local minima of the isobaric graph. For example, if the gradient of a function is non-zero at a point (p), the direction of the gradient is the direction in which the function increases most quickly from (p), and the magnitude of the gradient is the rate of increase in that direction, the greatest absolute directional derivative. The system may determine a point in the isobaric graph in which point (p) equals zero (e.g., representing a local minimum or local maximum). For example, a point on a graph (or its associated function) whose value is less than all other points near it is a local minimum, whereas a point on a graph (or its associated function) whose value is greater than all other points near it is a local maximum. The system may detect local minimums and maximums to identify a predicted event.

Additionally or alternatively, the system may determine the severity of a predicted event based on the magnitude of the gradient. For example, the magnitude of the gradient is the rate of increase in that direction. This rate may be positive or negative. Furthermore, the larger the magnitude (e.g., the absolute value of the magnitude), the greater the effect on the system state and/or a characteristic thereof. For example, based on the magnitude (and whether it is positive or negative), the system may represent a windfall event or a personal or financial emergency that negatively affects the financial projection. For example, the system may determine an effect of the predicted event based on the magnitude. The system may generate a user recommendation based on the effect.

In some embodiments, the system may perform isotropic scaling on the time-series prediction to identify a predicted event. For example, isotropic scaling is a linear transformation that enlarges (increases) or shrinks (diminishes) objects by a scale factor that is the same in all directions. In some embodiments, the system may perform non-uniform scaling (anisotropic scaling), which is obtained when at least one of the scaling factors is different from the others. For example, the system may determine a scale factor for the time-series prediction. The system may perform, based on the scale factor, a linear transformation to the time-series prediction to identify a predicted event for the time-series prediction.

In some embodiments, the system may receive a second user profile. In response to receiving the second user profile, the system may determine a second feature input for the second artificial intelligence model based on the second user profile. The system may input the second feature input into the second artificial intelligence model. The system may receive a different output from the second artificial intelligence model. The system may select, based on the different output, a different time-series prediction from the plurality of time-series predictions that corresponds to a different subset of the plurality of cohort clusters.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
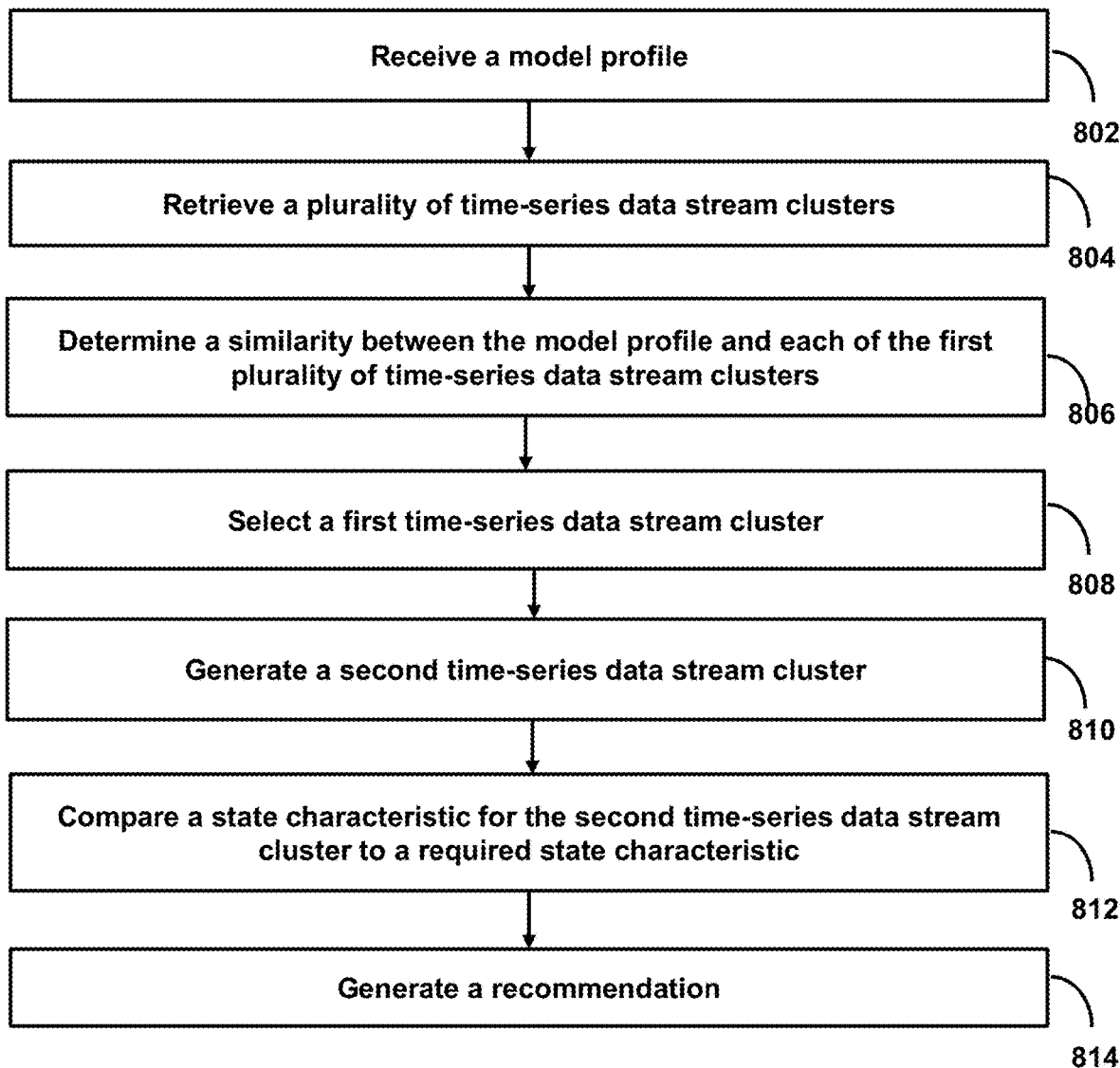
FIG. 8 shows a flowchart of the steps involved in aggregating time-series data streams based on potential state characteristics following aggregation, in accordance with one or more embodiments.

FIG. 8 shows a flowchart of the steps involved in aggregating time-series data streams based on potential state characteristics following aggregation, in accordance with one or more embodiments. For example, process 800 may represent the steps taken by one or more devices as shown herein when generating time-series predictions using artificial intelligence models.

In some embodiments, the system (and/or process 800) may be used to improve transmission efficiency of data. For example, the system may cluster data streams before inputting them into a machine learning model to improve efficiency. The system may determine whether to aggregate data (e.g., a plurality of time-series data streams) based on potential state characteristics (e.g., model utilization and performance) following aggregation. For example, clustering may help in reducing the dimensionality of the data by grouping similar data points together. Instead of considering each individual data point, clustering allows for representing a cluster with a representative or centroid. This reduces the overall data size and complexity, making it more manageable and efficient for processing by the machine learning model. With a smaller and more condensed representation of the data, the model can train and make predictions faster.

Additionally, training data (or other data input into a model) often contains noisy or irrelevant data points. By clustering the data streams, the model can identify and filter out the noise or outliers. The clusters representing the noise can be ignored or treated separately, reducing the impact of noisy data on the model's training and inference processes. This can lead to improved model efficiency and accuracy by focusing on the more meaningful patterns within the data. Clustering data streams can be particularly useful in scenarios where new data points continuously arrive in a streaming fashion. Clustering algorithms that support incremental learning can adapt to the evolving data stream by updating the existing clusters or creating new ones. This allows the machine learning model to efficiently process and learn from new incoming data without retraining the entire model. Incremental learning enables real-time or near-real-time analysis, improving efficiency by handling streaming data in a more agile and scalable manner.

In some embodiments, the system (and/or process 800) may be used to improve transmission efficiency of data. For example, the system may group or aggregate data packets or network traffic (e.g., comprising data streams) to optimize network utilization and performance. The system may determine whether to aggregate data (e.g., a plurality of time-series data streams) based on potential state characteristics (e.g., network utilization and performance) following aggregation. For example, instead of transmitting individual small packets, packet aggregation combines multiple smaller packets into larger ones. This reduces the overhead of transmitting individual packet headers and improves transmission efficiency by utilizing the available bandwidth more effectively. Aggregating packets can be particularly beneficial for protocols that have relatively high overhead, such as TCP/IP, by reducing the number of acknowledgments required. In some embodiments, clustering can be achieved through multicast or broadcast transmission. Instead of sending individual copies of data to each recipient, multicast allows for the transmission of data to multiple recipients simultaneously, reducing the overall bandwidth utilization. This is particularly useful for scenarios where the same data needs to be delivered to multiple destinations, such as video streaming or software updates.

In some embodiments, the system (and/or process 800) may be used to aggregate content related to digital media. For example, the system may generate recommendations for new digital media content that may be of interest to a user based on digital media currently consumed by the user. For example, the system may suggest new streaming media to a user based on their currently watched content by clustering or grouping similar content together and then recommending items from the same or related clusters. In some embodiments, the first model profile may comprise a user profile. The user profile may comprise data on user behavior, including the content they watch, their ratings, reviews, and other relevant interactions. The system may also create a user profile based on the collected data, which includes preferences, viewing history, ratings, and/or any other relevant information. The system may also cluster or group similar content together based on different factors such as genre, theme, director, actors, or user ratings. This clustering helps the system identify patterns and similarities among different items in the content library. The system may then use collaborative filtering to compare the user's cluster or segment with other similar clusters to identify content that is popular among those with similar preferences. If users in similar clusters have watched and enjoyed specific movies or TV shows, those recommendations are more likely to be suggested to the user. Notably, the system may further determine whether to aggregate data based on potential state characteristics following aggregation. For example, the system may determine whether aggregating data (e.g., streaming new digital media to the user) would introduce a threshold level of noise, outliers, and/or measurement errors related to content that the user did not wish to consume.

In some embodiments, the system (and/or process 800) may be used to create, recommend, and/or manage structured notes for a user. For example, the system may deliver proactive alerts, respond to real-time performance of a structured note, and/or advise whether any action needs to be taken to mitigate any issues detected with the performance of the structured note. In some embodiments, the system may use determinations related to structured notes to dynamically adjust investment goals and objectives over time. For example, the system may act as an always-on advisor for portfolio management.

As described herein, a structured note is a type of investment product that combines a bond with a derivative component. For example, a structured note may be a hybrid security that offers investors exposure to both the fixed income characteristics of a bond and the potential return linked to an underlying asset or index. Structured notes typically have a bond component, which provides the investor with a fixed income stream over a specific period. The bond component may pay periodic interest payments, known as coupons, and return the principal at maturity. Structured notes may also have a derivative component. The derivative component is what differentiates structured notes from traditional bonds. It is designed to provide exposure to an underlying asset or index, such as stocks, commodities, currencies, or interest rates. The performance of the derivative component determines the potential return of the structured note. The payoff structure of a structured note can vary depending on the issuer and the specific terms of the note. It may include features such as participation rates, caps, floors, or leverage, which can affect the return potential. The return on the structured note may be linked to the performance of the underlying asset or index in various ways, such as a percentage of the upside or downside, or a combination of both. Some structured notes offer partial or full principal protection, meaning that the investor is guaranteed to receive at least a portion of their initial investment back at maturity, regardless of the performance of the underlying asset or index.

At step 802, process 800 (e.g., using one or more components described herein) receives a model profile. For example, the system may receive a first model profile, wherein the first model profile is populated based on a first plurality of time-series data streams, and wherein the first model profile corresponds to a required state characteristic. For example, a model profile may comprise data on an investment portfolio for a given user, a data for transmission, digital media, etc. In embodiments, where the model profile relates to an investment portfolio, each time-series data stream may comprise individual stocks, investments, assets, and/or structured notes (or the current price thereof). Furthermore, each user profile may have specific investment requirements. These requirements may be based on the investment itself (e.g., corresponding to a specific company, type of company, etc.) or a state of the portfolio (e.g., a required rate of return, level of risk, etc.).

In some embodiments, the system may determine a first feature input based on the first model profile. A feature input, also known as an input feature or simply a feature, refers to the individual variables or characteristics that are provided as input to an artificial intelligence model. Features are used to represent the input data and capture relevant information that the model can learn from. The selection and representation of features play a crucial role in the performance and effectiveness of an artificial intelligence model. In some embodiments, features can be numerical, categorical, or even text-based, depending on the problem at hand. They are typically represented as a vector or matrix, where each element corresponds to a specific feature. For example, in an image classification task, the features could be pixel values or extracted image features such as color histograms or texture descriptors.

The choice of features depends on the nature of the problem and the available data. Domain knowledge and careful consideration are required to select features that are informative, relevant, and have a significant impact on the model's ability to generalize and make accurate predictions. Feature engineering, the process of selecting, transforming, or creating features, is often performed to improve the model's performance and extract meaningful patterns from the data.

For example, the system may determine a vector array type corresponding to the first model profile and determine the first feature input based on the vector array type. For example, the system may determine a type of data in the first model profile and select a feature input (or vector array type) based on the type of data. The system may select a numeric type. These are numeric values that represent measurable quantities. Examples include temperature, age, height, or any other continuous or discrete numerical variables. Numerical features are often used in regression or numerical prediction tasks. The system may select categorical features. These are non-numeric variables that represent different categories or classes. Examples include gender, race, or country of origin. Categorical features can be further divided into nominal (unordered categories) and ordinal (ordered categories). They are commonly used in classification tasks. The system may select textual features. These are features derived from text data, such as documents, articles, or customer reviews. Textual features can be obtained through various methods, such as bag-of-words representations, word embeddings (e.g., Word2Vec or GloVe), or more advanced techniques like transformers (e.g., BERT or GPT). The system may select image features. These features represent visual information extracted from images. They can be pixel values, color histograms, texture descriptors, or features extracted from pre-trained convolutional neural networks like VGG, ResNet, or Inception. Image features are commonly used in computer vision tasks, including image classification, object detection, and image segmentation.

In a structured note example, the system may determine that there is an interest and benefit in establishing a structured note (e.g., a time-series data stream cluster) for a user. By analyzing the user's financial goals (e.g., a required state characteristic that may be keyed to a future date or time stamp), the system accesses financial positions of the user and reviews their inbound cash flows versus cash outflow requirements with respect to potential structured notes (e.g., determine whether a second time-series data stream cluster that is based on aggregating a first time-series data stream cluster (e.g., a structured note) and a plurality of time-series data streams (e.g., representing the current portfolio of the user) is beneficial, meets user preferences, and/or meets qualifications requirements). For example, the system may analyze multiple sources to discern whether a user has any preferences regarding the types of companies associated with the bonds or equities that make up a given structured note. The system may enhance explicit instructions, if any, with interests derived from purchases, social media expressions, websites frequented, news articles read, etc. In some embodiments, the system may generate scores for structured notes. Scores may be assigned to each topic of interest using a taxonomy that the model creates, starting with a basic seeding list of topics. Over time, the list may incrementally change, with the system adjusting each topic's score accordingly. The output from this assessment will be coupled with additional factors to influence the selection of the instruments (e.g., time-series data streams and/or clusters thereof) that will make up the structured note.

In some embodiments, the system may employ web crawlers to determine whether the user has publicly expressed specific interests either for or against specific companies, technologies, ecological interests, social interests, governmental entities, high-profile persons, etc. The system may log the results, which may be classified using the artificial intelligence-managed taxonomies and scored based on the system's assessment of its frequency and perception of intensity (based on language and writing found). Preferences and interests explicitly stated/claimed by the user may be given strong weightings. The system may also examine the user's investment transaction experiences and evaluate the relative successes or failures to discern positive or negative weights for certain investments. These investments, like all other crawler-detected learnings, are classified using the model taxonomy. The system may then evoke a needs assessment engine that evaluates the user's financial situation compared to the developed financial needs projections to determine the ability of a user to fund a given structured note. The needs assessment engine may also independently evaluate a user's risk appetite, estimated optimal return versus risk ratios, and/or optimal note tenures (e.g., to determine a required state characteristic).

In some embodiments, the system may select particular data in a data stream. The system may select the data based on one or more criteria. For example, the system may select the most current data (e.g., a current price of an investment) or data corresponding to a given time period. For example, the system may receive a first time stamp. The system may then determine respective values for each data stream of the first plurality of time-series data streams corresponding to the first time stamp, wherein each data stream comprises a plurality of values corresponding to different time stamps.

At step 804, process 800 (e.g., using one or more components described herein) retrieves a plurality of time-series data stream clusters. For example, the system may retrieve a first plurality of time-series data stream clusters, wherein the first plurality of time-series data stream clusters is generated by a first artificial intelligence model that is trained to cluster a plurality of available time-series data streams into the first plurality of time-series data stream clusters by aggregating a subset of the plurality of available time-series data streams. For example, in the structured notes example, a first model may generate structured notes based on individual stocks, assets, and/or other structured notes. For example, the system may generate an input based on what structured notes (e.g., clusters of time-series data streams) are available.

In some embodiments, the first artificial intelligence model may by trained to cluster the plurality of available time-series data streams into the first plurality of time-series data stream clusters by aggregating the subset of the plurality of available time-series data streams based on correlation-distances between separate time-series data streams of the plurality of available time-series data streams. For example, the system may generate a matrix of pairwise correlations corresponding to the plurality of available time-series data streams. The system may then cluster the plurality of available time-series data streams based on pairwise distances. In some embodiments, the system may use labeled data to train a model. For example, the system may receive a first labeled feature input, wherein the first labeled feature input is labeled with a known subset for the first labeled feature input. The system may then train the first artificial intelligence model to classify the first labeled feature input with the known subset.

In some embodiments, the system may determine a second feature input based on the first plurality of time-series data stream clusters. For example, the system may generate an input based on what structured notes (e.g., clusters of time-series data streams) are available. In some embodiments, when dealing with multiple types of data and/or data streams, the system may use a combination of feature input types to capture the different characteristics and information present in the data. In some embodiments, the system may use feature engineering. Feature engineering, which involves selecting, transforming, or creating features, is often necessary to optimize the model's performance and capture the relevant information in the data.

In some embodiments, the system may generate a synthetic profile corresponding to the first model profile. The system may then retrieve the first plurality of time-series data stream clusters from the synthetic profile. For example, the system may use a different data set (e.g., from the data set used to generate the first model profile) to predict an occurrence of an event. The actual data found in the synthetic profile may comprise historic time-series data in which the historic time-series data indicates historic rates of change over a given time period and/or one or more state characteristics for a plurality of time-series data stream clusters and/or data streams therein. Furthermore, the system may filter the historic data set that is used based on similarities between the current state characteristics and/or required state characteristics.

In the structured note example, the system may employ web crawlers to locate new products from pre-authorized sources, structure the data associated with the product, classify the product using the model taxonomies, and persist the data in the product catalog. The system may establish each product's effective start date, which makes products eligible for auto selection; establish each product's effective end date, which terminates a product's eligibility to be auto selected; and/or curate the product catalog by updating the auto-selection eligibility and taxonomy classification.

At step 806, process 800 (e.g., using one or more components described herein) determines a similarity between the model profile and each of the first plurality of time-series data stream clusters. For example, the system may determine a first similarity between the first plurality of time-series data streams and each of the first plurality of time-series data stream clusters. For example, the system may determine, based on the first feature input and the second feature input, a first similarity between the first plurality of time-series data streams and each of the first plurality of time-series data stream clusters.

In some embodiments, the system may determine a similarity based on criteria derived from the first model profile and/or the required state characteristic. For example, the particular type of data in the model profile and/or the required state characteristic may indicate a particular technique for (or data to use for) determining the similarity. For example, the system may retrieve a first criterion for determining the first similarity, wherein the first criterion is based on the first model profile. The system may retrieve a second criterion for determining the first similarity, wherein the second criterion is based on the required state characteristic. The system may perform a multivariable analysis of the first plurality of time-series data streams and each of the first plurality of time-series data stream clusters based on the first criterion and the second criterion. To perform the multivariable analysis, the system may collect relevant data from multiple variables or data streams, clean the data by handling missing values, outliers, and inconsistencies, and transform the data into a suitable format for analysis.

The system may then determine the relationships and patterns in the data. The system may then select a subset of relevant features to reduce dimensionality and improve model performance. For example, the system may generate a plurality of respective feature inputs corresponding to each of the first plurality of time-series data stream clusters. The system may then compare the first feature input to the plurality of respective feature inputs.

In some embodiments, the system may further select a model to determine the similarity. The system may do so based on information in the first and/or second feature input. For example, the system may then select a model such as one based on linear regression, logistic regression, decision trees, random forests, support vector machines (SVM), or neural networks. For example, the system may select an algorithm from a plurality of algorithms for processing the first feature input and the second feature input. The system may select a second artificial intelligence model from a plurality of artificial intelligence models based on the algorithm. The system may then input the first feature input and the second feature input into the second artificial intelligence model to generate a first output, wherein the first output comprises the first similarity.

In the structured note example, the system may determine potential data streams for the time-series data stream clusters based on the user's interests, respective cohorts, and/or other information about the user using data sourced from multiple sources such as account transaction data, portfolio management experiential data, external public data sources, market data, customer social media interests, user-specified directions, etc. to match a user with a structured note (e.g., represented by a plurality of time-series data streams and/or clusters thereof). For example, the system may comprise a needs assessment engine and a product matching engine, which is always running in the background. The matching process may be triggered every time a change occurs in a user's profile. The product matching engine may review all the available products, which are curated by an automated product discovery tool.

In some embodiments, the product matching engine may create proposed structured notes based on inputs from the needs assessment engine and the catalog of products. The product matching engine may use the model to determine the order in which to filter the products and the relative importance of each filter. A filter with a greater importance may lead to product elimination from the pool of candidate products that could be included in a structured notes proposal. The model may be trained by the experience of the user's cohort. For example, the score assigned to a product may be based on the analyzed performance of that filter on other similar user experiences. The filters to be applied include the user's preferences, the user's interests, and the user's financial needs assessment and risk appetite. Instruments may be structured into proposed structured notes, which may be scored and then priced. For example, bonds and derivatives or equities may be mathematically structured, their risk profiles assessed, and their tenures calculated. To determine prices, the system may use prior experience (e.g., historic data streams) for the potential products included in the proposed structured notes.

At step 808, process 800 (e.g., using one or more components described herein) selects a first time-series data stream cluster. For example, the system may select a first time-series data stream cluster from the first plurality of time-series data stream clusters based on the first similarity exceeding a first similarity threshold. The system may use one or more thresholds to determine data that is similar and/or determine data that is not too similar. For example, the system may want to determine time-series data streams (or clusters thereof) that are similar, but not too similar. For example, the system may determine a first similarity threshold based on a minimum amount of similarity required between the first time-series data stream cluster from the first plurality of time-series data stream clusters and the model profile (or data stream therein). The system may then determine a second similarity threshold based on a maximum amount of similarity required between the first time-series data stream cluster from the first plurality of time-series data stream clusters and the model profile (or data stream therein). The system may then select the first time-series data stream cluster from the first plurality of time-series data stream clusters based on the first similarity not exceeding the second similarity threshold.

In some embodiments, the system may select the similarity threshold based on a profile characteristic of the first model profile. For example, the system may select different thresholds based on the type of data, the amount of data, the age of data, etc. In such cases, the system may determine a profile characteristic for the first model profile. The system may then determine the first similarity threshold based on the profile characteristic.

At step 810, process 800 (e.g., using one or more components described herein) generates a second time-series data stream cluster. For example, the system may generate a second time-series data stream cluster based on aggregating the first time-series data stream cluster and the first plurality of time-series data streams. In some embodiments, the system may normalize data before aggregating. For example, the system may retrieve a normalization factor for the first plurality of time-series data streams. The system may then apply the normalization factor to the first time-series data stream cluster to generate a normalized time-series data stream cluster. The system may then aggregate the normalized time-series data stream cluster and the first plurality of time-series data streams to generate the second time-series data stream cluster.

At step 812, process 800 (e.g., using one or more components described herein) compares a state characteristic for the second time-series data stream cluster to a required state characteristic. For example, the system may determine a state characteristic for the second time-series data stream cluster. The system may then compare the state characteristic to the required state characteristic.

In the structured notes example, the system may group multiple data streams that work together to evaluate the performance of the collection of proposed structured notes and/or a user's portfolio after aggregation with the structured note. The system may perform a plurality of comparisons and log the results. For example, the system may vary parameters over time, which can require a large number of iterations to cover all the meaningful permutations. The maximum number of tests may be $X_n$, where X is the number of parameters that each variable may be subjected to, and n is the number of variables. The system may test iterations by intelligently running the tests and assessing results to see if it is safe to predict outcomes without running iterations (e.g., to determine if there is an acceptable level of noise, outliers, and/or measurement errors). For example, the system may pull and log the results of each test and compare them to the predicted results. To limit the number of tests without compromising accuracy, the system may compare the actual results to the predicted results. The test range endpoints for each variable are assessed first, and then a binary search type of test point selection is performed to select points in the middle of the range. Within each range established by the binary search, results are predicted and saved for later comparison to the actual results. If the results are within an acceptable threshold, all other points between the endpoints are predicted and marked as such in the log (with an indication of whether the results are actual or predicted). If the results are not within an acceptable variation threshold, the predictions are marked as "out of range," the actual results are saved, and a new binary search is performed to establish new endpoints. This process is repeated and may continue iteratively until either all the test points have been assessed, or the predictions align with the actual results and predicted results can be used instead.

In some embodiments, the system may normalize time-series cluster data. For example, the system may determine that different data types reflect different aspects of data (e.g., the same time period, sampling frequency, data sources, data formats, etc.). For example, the system may retrieve a normalization factor for the first plurality of time-series data streams. The system may then apply the normalization factor to the second time-series data stream cluster to generate the first state characteristic. For example, when dealing with different data streams, normalization techniques can be applied to ensure that the data from each stream is brought to a common scale or range. The system may first determine the characteristics and properties of each data stream such as the type of data (numerical, categorical, etc.), the range of values, and any specific requirements or constraints. The system may then select a normalization factor based on this determination.

At step 814, process 800 (e.g., using one or more components described herein) generates a recommendation. For example, the system may generate, at a user interface, a first recommendation for the first time-series data stream cluster based on comparing the state characteristic to the required state characteristic. For example, the system may determine a difference between the first state characteristic and the required state characteristic. The system may then determine whether the difference exceeds a threshold difference (e.g., a given triggering event).

In the structured notes example, the system may generate a recommendation based on various circumstances and issues (which may be based on financial circumstances, regulatory compliance, etc.). For example, the system may use a stress model generator, which may be a parameterized model that is used to establish the stress scenarios. These parameters may be established using a model that examines the cohort experience (e.g., as it relates to a synthetic profile) and determines the conditions that drove positive and negative outcomes for those users. Factors correlated in the algorithm may include the cohort, the performance of comparable products included in the structured note, the risk profile of comparable products included in the structured note, the historical performance of the provider of comparable products included in the structured note, macroeconomic issues, user financial positions, user financial objectives, and geopolitical factors.

In some embodiments, the threshold difference may relate to whether a pressure point and/or other event is detected. For example, the system may determine a gradient for a time-series prediction based on the difference. The system may determine a magnitude of the gradient. The system may then identify a predicted event for the time-series prediction based on the magnitude. For example, the system may determine an effect of the predicted event based on the magnitude. The system may select the first recommendation from a plurality of recommendations based on the effect.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for responding to predicted events in computer systems based on outlier events in time-series data using artificial intelligence models trained on non-homogenous time-series data.
2. The method of the preceding embodiment, further comprising: receiving a first data set comprising a current state characteristic for a first system state; receiving a required future state characteristic for the first system state; selecting a second data set from a plurality of available datasets based on similarities between state characteristics for the second data set and the current state characteristic and the required future state characteristic, wherein the second data set comprises second rate-of-change data over a second time period; comparing the second rate-of-change data to a threshold rate of change to detect a rate-of-change event; generating a normalized rate-of-change event by normalizing the rate-of-change event based on the first data set; inputting the first data set into a first model to generate first rate-of-change data over a first time period for the first system state; generating modified first rate-of-change data based on the normalized rate-of-change event; and generating for display, on a user interface, a recommendation based on the modified first rate-of-change data.
3. The method of any one of the preceding embodiments, further comprising: receiving a raw time-series data; and generating the second data by applying a compression algorithm to the raw time-series data.
4. The method of any one of the preceding embodiments, further comprising: receiving a raw time-series data; determining minimum, median, and maximum points in segments of the raw time-series data; and generating the second data based on the minimum, median, and maximum points.
5. The method of any one of the preceding embodiments, further comprising: receiving a raw time-series data; receiving a compression factor; segmenting the raw time-series data into data segments; sorting values in each of the data segments; selecting respective minimum and maximum values from the values in each of the data segments; determining a respective median value for each of the data segments based on the respective minimum and maximum values; and re-sorting the respective median value for each of the data segments.
6. The method of any one of the preceding embodiments, further comprising: receiving a raw time-series data; and generating the second data by applying a fractal synthesis algorithm to the raw time-series data.
7. The method of any one of the preceding embodiments, further comprising: receiving a raw time-series data; applying a regularization to the raw time-series data to determine a function for the raw time-series data; and generating the second data based on the function.
8. The method of any one of the preceding embodiments, further comprising: receiving historical time-series data; training a second model using unsupervised learning, wherein the second model comprises a convolutional neural network; and selecting the second data set from the plurality of available datasets using the second model.
9. The method of any one of the preceding embodiments, further comprising: receiving historical time-series data; training the first model using unsupervised learning, wherein the first model comprises a convolutional neural network; and selecting the recommendation from a plurality of recommendations based on an output of the first model.
10. The method of any one of the preceding embodiments, wherein generating the normalized rate-of-change event by normalizing the rate-of-change event based on the first data set further comprises: determining a first start time corresponding to the first time period; determining a second start time corresponding to the second time period; determining a difference between the second start time and a time of the rate-of-change event; and applying the difference to the first start time to determine a predicted time of the rate-of-change event during the first time period.
11. The method of any one of the preceding embodiments, wherein the recommendation comprises an isobaric graphical representation.
12. The method of any one of the preceding embodiments, further comprising: determining an event type for the rate-of-change event; and determining the threshold rate based on the event type.
13. The method of any one of the preceding embodiments, further comprising: retrieving user profile data; and determining the event type based on the user profile data.
14. The method of any one of the preceding embodiments, wherein the recommendation comprises an option to adjust the current state characteristic.
15. A method for using cohort-based predictions in clustered time-series data in order to detect significant rate-of-change events.
16. The method of any one of the preceding embodiments, further comprising: receiving a first user profile, wherein the user profile comprises a current state characteristic; in response to receiving the first user profile, determining a first feature input based on the first user profile; retrieving a plurality of cohort clusters, wherein the plurality of cohort clusters is generated by a first artificial intelligence model that is trained to cluster a plurality of separate time-series data streams into the plurality of cohort clusters; inputting the first feature input into a second artificial intelligence model, wherein the second artificial intelligence model is trained to select a subset of the plurality of cohort clusters from the plurality of cohort clusters based on the first feature input, and wherein each cohort cluster of the plurality of cohort clusters corresponds to a respective cohort of users having similar current state characteristics; receiving an output from the second artificial intelligence model; selecting, based on the output, a time-series prediction from a plurality of time-series predictions, wherein each of the plurality of time-series predictions comprises a respective predicted event, and wherein each cohort cluster of the subset of the plurality of cohort clusters corresponds to a respective time-series prediction of the plurality of time-series predictions; and generating, at a user interface, the time-series prediction.

17. The method of any one of the preceding embodiments, wherein determining the first feature input based on the first user profile comprises: determining a subset of current state characteristics for generating a first feature input based on the current state characteristic; populating the first user profile with the subset of state characteristics; and in response to receiving the first user profile, determining a first feature input based on the subset of state characteristics.

18. The method of any one of the preceding embodiments, wherein populating the first user profile with the subset of state characteristics further comprises: crawling the Internet for a remote server comprising the subset of state characteristics; and retrieving the subset of state characteristics from the remote server.

19. The method of any one of the preceding embodiments, wherein determining the first feature input based on the first user profile further comprises: receiving, at the user interface, a user selection of the current state characteristic; and determining to use the current state characteristic for the first feature input based on the first feature input.

20. The method of any one of the preceding embodiments, further comprising: receiving a second user profile; in response to receiving the second user profile, determining a second feature input for the second artificial intelligence model based on the second user profile; inputting the second feature input into the second artificial intelligence model; receiving a different output from the second artificial intelligence model; and selecting, based on the different output, a different time-series prediction from the plurality of time-series predictions that corresponds to a different subset of the plurality of cohort clusters.

21. The method of any one of the preceding embodiments, wherein generating the time-series prediction further comprises: determining a gradient for the time-series prediction; determining a magnitude of the gradient; and identifying a predicted event for the time-series prediction based on the magnitude.

22. The method of any one of the preceding embodiments, further comprising: determining an effect of the predicted event based on the magnitude; and generating a user recommendation based on the effect.

23. The method of any one of the preceding embodiments, wherein generating the time-series prediction further comprises: determining a scale factor for the time-series prediction; and performing, based on the scale factor, a linear transformation to the time-series prediction to identify a predicted event for the time-series prediction.

24. The method of any one of the preceding embodiments, wherein the first artificial intelligence model is trained to cluster the plurality of separate time-series data streams into the plurality of cohort clusters through unsupervised hierarchical clustering into hierarchies of correlation-distances between separate time-series data streams.

25. The method of any one of the preceding embodiments, wherein training the first artificial intelligence model comprises: generating a matrix of pairwise correlations corresponding to the plurality of separate time-series data streams; and clustering the plurality of separate time-series data streams based on pairwise distances.

26. The method of any one of the preceding embodiments, further comprising: receiving a first labeled feature input, wherein the first labeled feature input is labeled with a known cohort cluster for the first labeled feature input; and training the second artificial intelligence model to classify the first labeled feature input with the known cohort cluster.

27. The method of any one of the preceding embodiments, wherein generating the time-series prediction further comprises: generating an isobaric representation of the time-series prediction; and identifying a predicted event for the time-series prediction in the isobaric representation.

28. The method of any one of the preceding embodiments, wherein generating the time-series prediction further comprises: identifying a predicted event for the time-series prediction; and generating an option to modify the current state characteristic based on the predicted event.

29. The method of any one of the preceding embodiments, further comprising: receiving a first model profile, wherein the first model profile is populated based on a first plurality of time-series data streams, and wherein the first model profile corresponds to a required state characteristic; determining a first feature input based on the first model profile; retrieving a first plurality of time-series data stream clusters, wherein the first plurality of time-series data stream clusters is generated by a first artificial intelligence model that is trained to cluster a plurality of available time-series data streams into the first plurality of time-series data stream clusters by aggregating a subset of the plurality of available time-series data streams; determining a second feature input based on the first plurality of time-series data stream clusters; determining, based on the first feature input and the second feature input, a first similarity between the first plurality of time-series data streams and each of the first plurality of time-series data stream clusters; selecting a first time-series data stream cluster from the first plurality of time-series data stream clusters based on the first similarity exceeding a first similarity threshold; generating a second time-series data stream cluster based on aggregating the first time-series data stream cluster and the first plurality of time-series data streams; determining a first state characteristic for the second time-series data stream cluster; comparing the first state characteristic to the required state characteristic; and generating, at a user interface, a first recommendation for the first time-series data stream cluster based on comparing the first state characteristic to the required state characteristic.

30. The method of any one of the preceding embodiments, wherein determining the first feature input based on the first model profile further comprises: determining a vector array type corresponding to the first model profile; and determining the first feature input based on the vector array type.

31. The method of any one of the preceding embodiments, wherein populating the first model profile based on the first plurality of time-series data streams further comprises: receiving a first time stamp; and determining respective values for each data stream of the first plurality of time-series data streams corresponding to the first time stamp, wherein each data stream comprises a plurality of values corresponding to different time stamps.

32. The method of any one of the preceding embodiments, wherein determining, based on the second feature input, the first similarity between the first plurality of time-series data streams and each of the first plurality of time-series data stream clusters further comprises: retrieving a first criterion for determining the first similarity from the second feature input, wherein the first criterion is based on the first model profile; retrieving a second criterion for determining the first similarity from the second feature input, wherein the second criterion is based on the required state characteristic; and performing a multivariable analysis of the first plurality of time-series data streams and each of the first plurality of time-series data stream clusters based on the first criterion and the second criterion.

33. The method of any one of the preceding embodiments, wherein determining, based on the first feature input and the second feature input, the first similarity between the first plurality of time-series data streams and each of the first plurality of time-series data stream clusters further comprises: selecting an algorithm from a plurality of algorithms for processing the first feature input and the second feature input; selecting a second artificial intelligence model from a plurality of artificial intelligence models based on the algorithm; and inputting the first feature input and the second feature input into the second artificial intelligence model to generate a first output, wherein the first output comprises the first similarity.

34. The method of any one of the preceding embodiments, wherein determining, based on the first feature input and the second feature input, the first similarity between the first plurality of time-series data streams and each of the first plurality of time-series data stream clusters further comprises: generating a plurality of respective feature inputs corresponding to each of the first plurality of time-series data stream clusters; and comparing the first feature input to the plurality of respective feature inputs.

35. The method of any one of the preceding embodiments, wherein determining the first state characteristic for the second time-series data stream cluster further comprises: retrieving a normalization factor for the first plurality of time-series data streams; and applying the normalization factor to the second time-series data stream cluster to generate the first state characteristic.

36. The method of any one of the preceding embodiments, wherein generating the second time-series data stream cluster based on aggregating the first time-series data stream cluster and the first plurality of time-series data streams further comprises: retrieving a normalization factor for the first plurality of time-series data streams; applying the normalization factor to the first time-series data stream cluster to generate a normalized time-series data stream cluster; and aggregating the normalized time-series data stream cluster and the first plurality of time-series data streams to generate the second time-series data stream cluster.

37. The method of any one of the preceding embodiments, wherein selecting the first time-series data stream cluster from the first plurality of time-series data stream clusters based on the first similarity exceeding the first similarity threshold further comprises: determining a profile characteristic for the first model profile; and determining the first similarity threshold based on the profile characteristic.

38. The method of any one of the preceding embodiments, wherein selecting the first time-series data stream cluster from the first plurality of time-series data stream clusters based on the first similarity exceeding the first similarity threshold further comprises: determining the first similarity threshold based on a minimum amount of similarity required between the first time-series data stream cluster from the first plurality of time-series data stream clusters; determining a second similarity threshold based on a maximum amount of similarity required between the first time-series data stream cluster from the first plurality of time-series data stream clusters; and selecting the first time-series data stream cluster from the first plurality of time-series data stream clusters based on the first similarity not exceeding the second similarity threshold.

39. The method of any one of the preceding embodiments, wherein generating the first recommendation for the first time-series data stream cluster based on comparing the first state characteristic to the required state characteristic further comprises: determining a difference between the first state characteristic and the required state characteristic; and determining whether the difference exceeds a threshold difference.

40. The method of any one of the preceding embodiments, wherein determining the difference between the first state characteristic and the required state characteristic further comprises: determining a gradient for a time-series prediction based on the difference; determining a magnitude of the gradient; and identifying a predicted event for the time-series prediction based on the magnitude.

41. The method of any one of the preceding embodiments, further comprising: determining an effect of the predicted event based on the magnitude; and selecting the first recommendation from a plurality of recommendations based on the effect.

42. The method of any one of the preceding embodiments, wherein the first artificial intelligence model is trained to cluster the plurality of available time-series data streams into the first plurality of time-series data stream clusters by aggregating the subset of the plurality of available time-series data streams based on correlation-distances between separate time-series data streams of the plurality of available time-series data streams.

43. The method of any one of the preceding embodiments, wherein training the first artificial intelligence model comprises: generating a matrix of pairwise correlations corresponding to the plurality of available time-series data streams; and clustering the plurality of available time-series data streams based on pairwise distances.

44. The method of any one of the preceding embodiments, further comprising: receiving a first labeled feature input, wherein the first labeled feature input is labeled with a known subset for the first labeled feature input; and training the first artificial intelligence model to classify the first labeled feature input with the known subset.

45. One or more non-transitory, machine-readable media storing instructions that, when executed by a data processing apparatus, cause the data processing apparatus to perform operations comprising those of any of embodiments 1-44.

46. A system comprising one or more processors; and memory-storing instructions that, when executed by the processors, cause the processors to effectuate operations comprising those of any of embodiments 1-44.

47. A system comprising means for performing any of embodiments 1-44.

We claim:

1. A system for aggregating time-series data streams based on potential state characteristics following aggregation, the system comprising:
one or more processors; and
one or more non-transitory machine readable media comprising instructions recorded thereon that when executed by the one or more processors cause operations comprising:
receiving a first model profile, wherein the first model profile is populated based on a first plurality of time-series data streams, and wherein the first model profile corresponds to a required state characteristic;
determining a first feature input based on the first model profile;
receiving a plurality of available time-series data streams;
generating training data comprising labeled feature inputs with known clusters using a historic data set having predetermined characteristics at a beginning or ending of a selected time period and a synthetically generated data set, wherein the synthetically generated data set is generated by resampling outlier events in the historic data set;
training, using the training data, a first neural network to classify labeled feature inputs with known clusters based on similarities between state characteristics in the labeled feature inputs and the known clusters;
using the first neural network to cluster the plurality of available time-series data streams into a first plurality of time-series data stream clusters by aggregating a subset of the plurality of available time-series data streams;
generating a synthetic profile corresponding to the first model profile;
retrieving the first plurality of time-series data stream clusters from the synthetic profile, wherein the first plurality of time-series data stream clusters is generated by the first neural network;
determining a second feature input based on the first plurality of time-series data stream clusters;
generating a plurality of respective feature inputs corresponding to each of the first plurality of time-series data stream clusters;
comparing the second feature input to the plurality of respective feature inputs;
determining, based on comparing the second feature input to the plurality of respective feature inputs, a first similarity metric between the first plurality of time-series data streams and each of the first plurality of time-series data stream clusters;
selecting a first time-series data stream cluster from the first plurality of time-series data stream clusters based on the first similarity metric exceeding a first similarity threshold;
generating a second time-series data stream cluster based on aggregating the first time-series data stream cluster and the first plurality of time-series data streams;
determining a first state characteristic for the second time-series data stream cluster;
comparing the first state characteristic to the required state characteristic; and
generating, at a user interface, a first recommendation for the first time-series data stream cluster based on comparing the first state characteristic to the required state characteristic.

2. A method for aggregating time-series data streams based on potential state characteristics following aggregation, the method comprising:
receiving a first model profile, wherein the first model profile is populated based on a first plurality of time-series data streams, and wherein the first model profile corresponds to a required state characteristic;
determining a first feature input based on the first model profile;
receiving a plurality of available time-series data streams;
generating training data comprising labeled feature inputs with known clusters using a historic data set having predetermined characteristics at a beginning or ending of a selected time period and a synthetically generated data set, wherein the synthetically generated data set is generated by resampling outlier events in the historic data set;
training, using the training data, a first neural network to classify the labeled feature inputs with the known clusters based on similarities between state characteristics in the labeled feature inputs and the known clusters;
using the neural network to cluster the plurality of available time-series data streams into a first plurality of time-series data stream clusters by aggregating a subset of the plurality of available time-series data streams;
retrieving the first plurality of time-series data stream clusters, wherein the first plurality of time-series data stream clusters is generated by the first neural network;
determining a second feature input based on the first plurality of time-series data stream clusters;
determining, based on the first feature input and the second feature input, a first similarity metric between the first plurality of time-series data streams and each of the first plurality of time-series data stream clusters;
selecting a first time-series data stream cluster from the first plurality of time-series data stream clusters based on the first similarity metric exceeding a first similarity threshold;
generating a second time-series data stream cluster based on aggregating the first time-series data stream cluster and the first plurality of time-series data streams;
determining a first state characteristic for the second time-series data stream cluster;
comparing the first state characteristic to the required state characteristic; and
generating, at a user interface, a first recommendation for the first time-series data stream cluster based on comparing the first state characteristic to the required state characteristic.

3. The method of claim 2, wherein determining the first feature input based on the first model profile further comprises:
determining a vector array type corresponding to the first model profile; and
determining the first feature input based on the vector array type.

4. The method of claim 2, wherein populating the first model profile based on the first plurality of time-series data streams further comprises:
receiving a first time stamp; and
determining respective values for each data stream of the first plurality of time-series data streams corresponding to the first time stamp, wherein each data stream comprises a plurality of values corresponding to different time stamps.

5. The method of claim 2, wherein determining, based on the first feature input and the second feature input, the first similarity metric between the first plurality of time-series data streams and each of the first plurality of time-series data stream clusters further comprises:
retrieving a first criterion for determining the first similarity metric, wherein the first criterion is based on the first model profile;
retrieving a second criterion for determining the first similarity metric, wherein the second criterion is based on the required state characteristic; and
performing a multivariable analysis of the first plurality of time-series data streams and each of the first plurality of time-series data stream clusters based on the first criterion and the second criterion.

6. The method of claim 2, wherein determining, based on the first feature input and the second feature input, the first similarity metric between the first plurality of time-series data streams and each of the first plurality of time-series data stream clusters further comprises:
selecting an algorithm from a plurality of algorithms for processing the first feature input and the second feature input;
selecting a second artificial intelligence model from a plurality of artificial intelligence models based on the algorithm; and
inputting the first feature input and the second feature input into the second artificial intelligence model to generate a first output, wherein the first output comprises the first similarity metric.

7. The method of claim 2, wherein determining, based on the first feature input and the second feature input, the first similarity metric between the first plurality of time-series data streams and each of the first plurality of time-series data stream clusters further comprises:
generating a plurality of respective feature inputs corresponding to each of the first plurality of time-series data stream clusters; and
comparing the first feature input to the plurality of respective feature inputs.

8. The method of claim 2, wherein determining the first state characteristic for the second time-series data stream cluster further comprises:
retrieving a normalization factor for the first plurality of time-series data streams; and
applying the normalization factor to the second time-series data stream cluster to generate the first state characteristic.

9. The method of claim 2, wherein generating the second time-series data stream cluster based on aggregating the first time-series data stream cluster and the first plurality of time-series data streams further comprises:
retrieving a normalization factor for the first plurality of time-series data streams;
applying the normalization factor to the first time-series data stream cluster to generate a normalized time-series data stream cluster; and
aggregating the normalized time-series data stream cluster and the first plurality of time-series data streams to generate the second time-series data stream cluster.

10. The method of claim 2, wherein selecting the first time-series data stream cluster from the first plurality of time-series data stream clusters based on the first similarity metric exceeding the first similarity threshold further comprises:
determining a profile characteristic for the first model profile; and
determining the first similarity threshold based on the profile characteristic.

11. The method of claim 2, wherein selecting the first time-series data stream cluster from the first plurality of time-series data stream clusters based on the first similarity metric exceeding the first similarity threshold further comprises:
determining the first similarity threshold based on a minimum amount of similarity required between the first time-series data stream cluster from the first plurality of time-series data stream clusters and the first plurality of time-series data streams;
determining a second similarity threshold based on a maximum amount of similarity required between the first time-series data stream cluster from the first plurality of time-series data stream clusters and the first plurality of time-series data streams; and
selecting the first time-series data stream cluster from the first plurality of time-series data stream clusters based on the first similarity metric not exceeding the second similarity threshold.

12. The method of claim 2, wherein generating the first recommendation for the first time-series data stream cluster based on comparing the first state characteristic to the required state characteristic further comprises:
determining a difference between the first state characteristic and the required state characteristic; and
determining whether the difference exceeds a threshold difference.

13. The method of claim 12, wherein determining the difference between the first state characteristic and the required state characteristic further comprises:
determining a gradient for a time-series prediction based on the difference;
determining a magnitude of the gradient; and
identifying a predicted event for the time-series prediction based on the magnitude.

14. The method of claim 13, further comprising:
determining an effect of the predicted event based on the magnitude; and
selecting the first recommendation from a plurality of recommendations based on the effect.

15. The method of claim 2, wherein the first neural network is trained to cluster the plurality of available time-series data streams into the first plurality of time-series data stream clusters by aggregating the subset of the plurality of available time-series data streams based on correlation-distances between separate time-series data streams of the plurality of available time-series data streams.

16. The method of claim 2, wherein training the first neural network comprises:
generating a matrix of pairwise correlations corresponding to the plurality of available time-series data streams; and
clustering the plurality of available time-series data streams based on pairwise distances.

17. One or more non-transitory machine readable media comprising instructions recorded thereon that when executed by one or more processors cause operations comprising:
receiving a first model profile, wherein the first model profile is populated based on a first plurality of time-series data streams, and wherein the first model profile corresponds to a required state characteristic;
receiving a plurality of available time-series data streams;
generating training data comprising labeled feature inputs with known clusters using a historic data set having predetermined characteristics at a beginning or ending of a selected time period and a synthetically generated data set, wherein the synthetically generated data set is generated by resampling outlier events in the historic data set;

training, using the training data, a first neural network to classify the labeled feature inputs with the known clusters based on similarities between state characteristics in the labeled feature inputs and the known clusters;

using the first neural network to cluster the plurality of available time-series data streams into a first plurality of time-series data stream clusters by aggregating a subset of the plurality of available time-series data streams;

retrieving the first plurality of time-series data stream clusters, wherein the first plurality of time-series data stream clusters is generated by the first neural network;

determining a first similarity metric between the first plurality of time-series data streams and each of the first plurality of time-series data stream clusters;

selecting a first time-series data stream cluster from the first plurality of time-series data stream clusters based on the first similarity metric exceeding a first similarity threshold;

generating a second time-series data stream cluster based on aggregating the first time-series data stream cluster and the first plurality of time-series data streams;

determining a first state characteristic for the second time-series data stream cluster;

comparing the first state characteristic to the required state characteristic; and generating, at a user interface, a first recommendation for the first time-series data stream cluster based on comparing the first state characteristic to the required state characteristic.

18. The one or more non-transitory machine readable media of claim 17, wherein populating the first model profile based on the first plurality of time-series data streams further comprises:

receiving a first time stamp; and determining respective values for each data stream of the first plurality of time-series data streams corresponding to the first time stamp, wherein each of the data streams comprises a plurality of values corresponding to different time stamps.

19. The one or more non-transitory machine readable media of claim 17, wherein selecting the first time-series data stream cluster from the first plurality of time-series data stream clusters based on the first similarity metric exceeding the first similarity threshold further comprises:

determining the first similarity threshold based on a minimum amount of similarity required between the first time-series data stream cluster from the first plurality of time-series data stream clusters;

determining a second similarity threshold based on a maximum amount of similarity required between the first time-series data stream cluster from the first plurality of time-series data stream clusters; and selecting the first time-series data stream cluster from the first plurality of time-series data stream clusters based on the first similarity metric not exceeding the second similarity threshold.

* * * * *